United States Patent [19]

Takahashi et al.

[11] Patent Number: 4,495,264
[45] Date of Patent: Jan. 22, 1985

[54] ELECTROPHOTOGRAPHIC PHOTOSENSITIVE MEMBER COMPRISING DISAZO COMPOUND

[75] Inventors: Hideyuki Takahashi; Shozo Ishikawa, both of Yokohama, Japan

[73] Assignee: Canon Kabushiki Kaisha, Tokyo, Japan

[21] Appl. No.: 589,343

[22] Filed: Mar. 14, 1984

[30] Foreign Application Priority Data

Mar. 15, 1983 [JP] Japan ................................. 58-41475
Mar. 15, 1983 [JP] Japan ................................. 58-41476
Mar. 15, 1983 [JP] Japan ................................. 58-41477

[51] Int. Cl.³ .......................... G03G 5/06; G03G 5/14
[52] U.S. Cl. ........................................ 430/58; 430/72; 430/76; 430/77; 430/33
[58] Field of Search ................... 430/72, 76, 70, 71, 430/75

[56] References Cited

U.S. PATENT DOCUMENTS 4,233,384 11/1980 Turner et al. ................ 430/72 X

Primary Examiner—John D. Welsh
Attorney, Agent, or Firm—Fitzpatrick, Cella, Harper & Scinto

[57] ABSTRACT

An electrophotographic photosensitive member and use thereof, having a photosensitive layer upon or over an electrically conductive substrate, the photosensitive layer comprising an organic photoconductive material selected from the group consisting of the following general formula (1), (2), or (3):

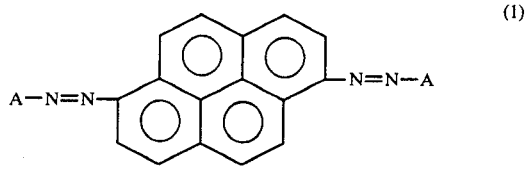

wherein A represents a coupler component having aromaticity,

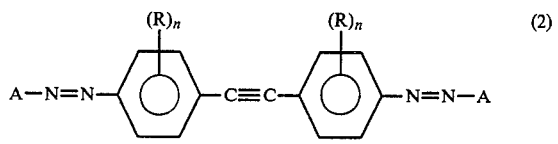

wherein, A represents a coupler component having aromaticity, R represents hydrogen, halogen, alkyl, or alkoxy, and n represents an integer of 1 to 4,

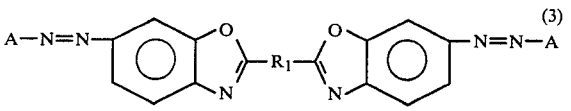

wherein, A represents a coupler component having aromaticity and $R_1$ represents a single bond or a substituted or unsubstituted divalent hydrocarbon or heterocyclic residue.

41 Claims, No Drawings

ELECTROPHOTOGRAPHIC PHOTOSENSITIVE MEMBER COMPRISING DISAZO COMPOUND

BACKGROUND OF THE INVENTION

1. Field of the Invention

This invention relates to electrophotographic photosensitive members and use thereof, and more particularly, to those containing a novel organic photoconductive material.

2. Description of the Prior Art

There have so far been known electrophotographic photosensitive members in which inorganic photoconductive materials such as selenium, cadmium sulphide, and zinc oxide are utilized as photosensitive components.

On the other hand, many kinds of organic photoconductive materials have been developed since specific organic compounds were found to exhibit photoconductivity. The organic photoconductive materials hitherto disclosed include; polymers, e.g. poly(N-vinylcarbazole, polyvinylanthracene and the like; low molecular compounds, e.g. carbazole, anthracene, pyrazoline compounds, oxadiazole compounds, hydrazones, polyarylalkanes and the like; and pigments or dyes, e.g. phthalocyanine pigments, azo pigments, cyanine dyes, polycyclic quinone pigments, perylene pigments, indigo dyes, thioindigo dyes, and methine dyes derived from squaric acid. In particular, various organic photoconductive pigments and dyes have been proposed for reasons such that these organic materials are easy to synthesize as compared with inorganic photoconductive materials and additionally a compound having suitable spectral sensitivity may be selected from a wide variety of organic photoconductive materials. For example, electrophotographic photosensitive members disclosed in U.S. Pat. Nos. 4,123,270, 4,247,614, 4,251,613, 4,251,614, 4,256,821, 4,260,672, 4,268,596, 4,278,747, and 4,293,628 comprise two laminated photosensitive layers which function respectively as a charge generation layer and a charge transport layer, wherein a photoconductive disazo pigment is used as a charge-generating material.

Electrophotographic photosensitive members employing such organic photoconductive materials can be produced with extremely high productivity and at low costs because the production thereof is possible by coating method with aid of a binder suitably selected, and are further advantageous in that the working wavelength region is freely controllable by varying organic photoconductive pigments or dyes. On the contrary, these photosensitive members have difficulty in the sensitivity and durability, so that those put into practical use until now are extremely limited.

SUMMARY OF THE INVENTION

An object of the invention is to provide a novel organic photoconductive material.

Another object of the invention is to provide an electrophotographic photosensitive member improved in photographic characteristics by employing a specific organic photoconductive material, particularly improved to have a sufficient sensitivity for practical use and exhibit stable charge bearing characteristics during repeated operations.

According to the present invention there is provided an electrophotographic photosensitive member having a photosensitive layer upon or over an electrically conductive substrate, the photosensitive layer comprising an organic photoconductive material selected from the group consisting of the following general formula (1), (2), or (3):

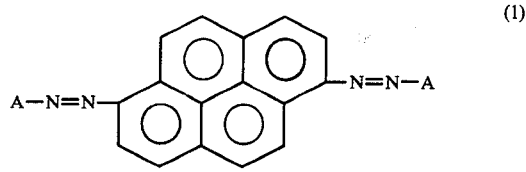

wherein A represents a coupler component having aromaticity,

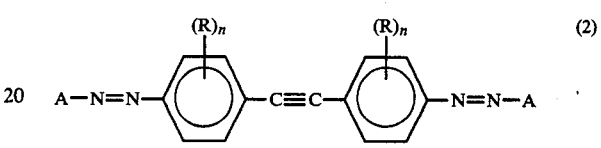

wherein, A represents a coupler component having aromaticity, R represents hydrogen, halogen, alkyl, or alkoxy, and n represents an integer of 1 to 4,

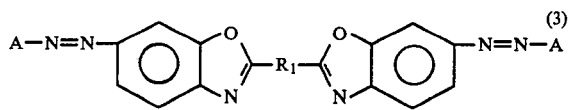

wherein, A represents a coupler component having aromaticity and $R_1$ represents a single bond or a substituted or unsubstituted divalent hydrocarbon or heterocylic residue.

According to the present invention there is further provided a method for forming images which comprises the steps of (a) applying charge to the electrophotographic photosensitive member comprising electrically conductive substrate, the charge transport layer and charge generation layer comprising photoconductive material of the formula (1), (2) or (3);

(b) image-exposing to form static latent image;

(c) developing the static latent image to form toner image;

(d) transferring the developed toner image to a transfer member;

(e) exposing light to the electrophotographic photosensitive member so as to eliminate the residual charge; and (f) removing the remained toner from the electrophotographic photosensitive member by cleaner.

DETAILED DESCRIPTION OF EMBODIMENTS OF THE INVENTION

In preferred embodiments of the invention, a coupler component having a phenolic hydroxyl group is suited as the aromaticity-having coupler component represented by A of the general formulas (1)–(3). Particularly suitable coupler components are of a hydroxynaphthoic acid amide type, hydroxynaphthoic acid imide type, and aminonaphthol type. More specifically, suitable coupler components include those of hydroxynaphthoic acid amide type represented by the following general formula (A), those of hydroxynaphthoic acid imide type of the following general formula (B) or (C), and those of aminonaphthol type of the following general formula (D).

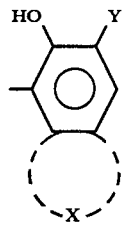
(A)

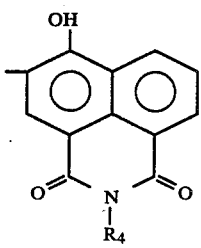
(B)

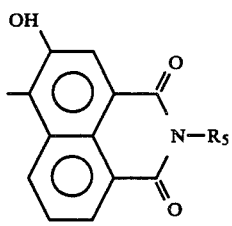
(C)

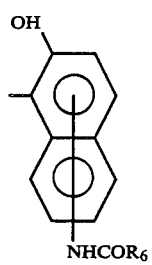
(D)

In the formula (A); X represents a residue which is condensed with the benzene ring to form an aromatic hydrocarbon ring or heterocyclic ring, e.g. naphthalene ring, anthracene ring, carbazole ring, dibenzofuran ring, or benzocarbazole ring; and Y represents the group of —CONR$_2$R$_3$ or —COOR$_2$ (R$_3$ is a radical selected from hydrogen; substituted or unsubstituted alkyls, e.g. methyl, ethyl, propyl, butyl, 2-hydroxyethyl, and 3-hydroxypropyl; and substituted or unsubstituted aryls, e.g. phenyl naphthyl tolyl, xylyl, chlorophenyl, dichlorophenyl, methoxyphenyl, and aminophenyl. R$_2$ is a radical selected from substituted or unsubstituted alkyls, e.g. methyl, ethyl, propyl, butyl, 2-hydroxyethyl, and 3-hydroxypropyl; substituted or unsubstituted aryls, e.g. phenyl naphthyl tolyl, xylyl, chlorophenyl, dichlorophenyl, methoxyphenyl, and aminophenyl; and heterocyclic residues, e.g. pyridyl, quinolyl, carbazolyl, and thiazolyl; amino, e.g. diphenylamino; aralkyl, e.g. benzyl, phenetyl, naphtylmethyl), or the group of —CONHNR$_7$R$_8$ (R$_7$ and R$_8$ represent each a substituted or unsubstituted aryl, e.g. phenyl, and naphthyl). Substituents on the above radicals R$_2$, R$_3$, R$_7$, and R$_8$ include; alkyls, e.g. methyl and ethyl; halogens, e.g. fluorine, chlorine, bromine; alkoxyls, e.g. methoxy and ethoxy; acyls, e.g. acetyl benzoyl; alkylthios, e.g. methylthio and ethylthio; arylthio e.g. phenylthio; aryls, e.g. phenyl; aralkyls, e.g. benzyl; nitro; cyano; and substituted aminos, e.g. dimethylamino, diethylamino, dibenzylamino, and ethylamino. R$_4$ in the formula (B) and R$_5$ in the formula (C) represent each a radical selected from the group consisting of substituted or unsubstituted alkyls and aryls such as phenyl and naphthyl. More specifically, R$_4$ and R$_5$ represent each; alkyl, e.g. methyl, ethyl, or propyl; hydroxyalkyl, e.g. hydroxymethyl, or hydroxyethyl; alkoxyalkyl, e.g. methoxymethyl, or ethoxymethyl; cyanoalkyl; aminoalkyl; N-alkylaminoalkyl; N,N-dialkylaminoalkyl; halogenated alkyl; aralkyl, e.g. benzyl or phenethyl; phenyl or substituted phenyl; naphthyl or substituted naphthyl (the substituents are the same as in the above R$_2$, R$_3$, R$_7$, and R$_8$).

R$_6$ in the formula (D) represents; substituted or unsubstituted alkyl, e.g. methyl, ethyl, propyl, butyl, amyl, hexyl, hydroxymethyl, hydroxyethyl, methoxyethyl, ethoxyethyl, chloroethyl, or chloropropyl; substituted or unsubstituted aryl, e.g. phenyl, tolyl, xylyl, methoxyphenyl, ethoxyphenyl, chlorophenyl, dichlorophenyl, aminophenyl, or naphthyl; or substituted or unsubstituted aralkyl, e.g. benzyl, methylbenzyl, ethylbenzyl, or methoxybenzyl.

In the formula (2), R represents hydrogen, halogen (e.g. chlorine, bromine, or iodine), alkyl (e.g. methyl, ethyl, propyl, butyl, or amyl), or alkoxy (e.g. methoxy, ethoxy, propoxy, or butoxy), and n represents an integer of 1 to 4.

In the formula (3), R$_1$ represents a single bond, substituted or unsubstituted divalent hydrocarbon group e.g. —CH=CH— or

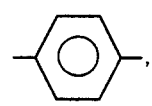

or substituted or unsubstituted divalent heterocyclic group, e.g.

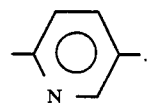

Typical examples of the organic photoconductive material of the invention are disazo pigments listed below.

Disazo pigments of the formula (1):

| No. | |
|---|---|
| 1-1 | 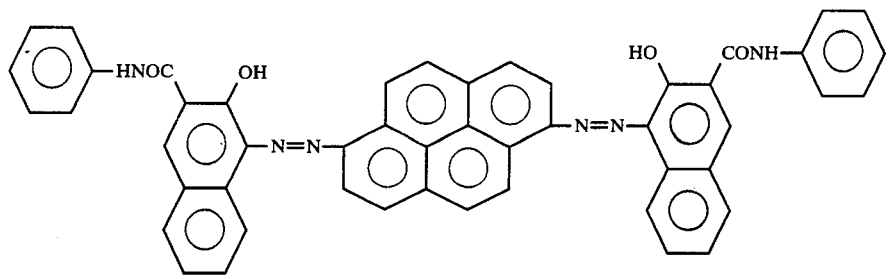 |
| 1-2 | 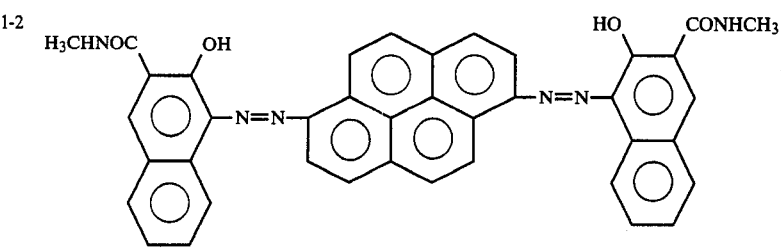 |
| 1-3 | 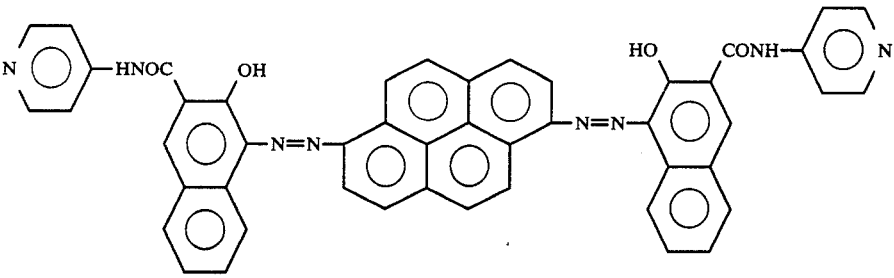 |
| 1-4 | 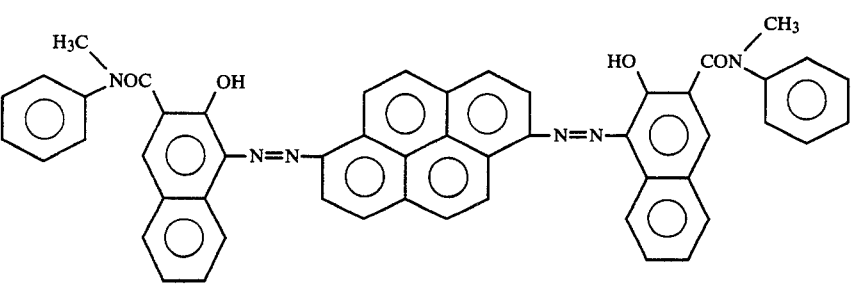 |
| 1-5 | 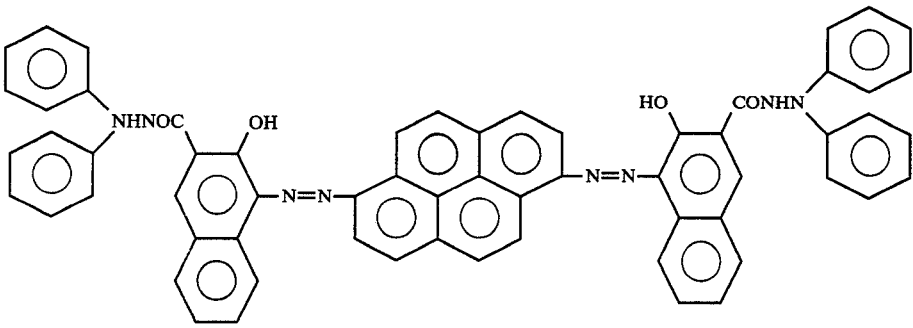 |

| No. |
|---|
| 1-6 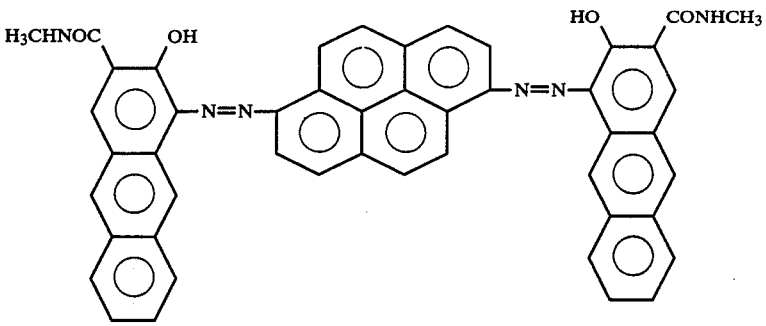 |
| 1-7 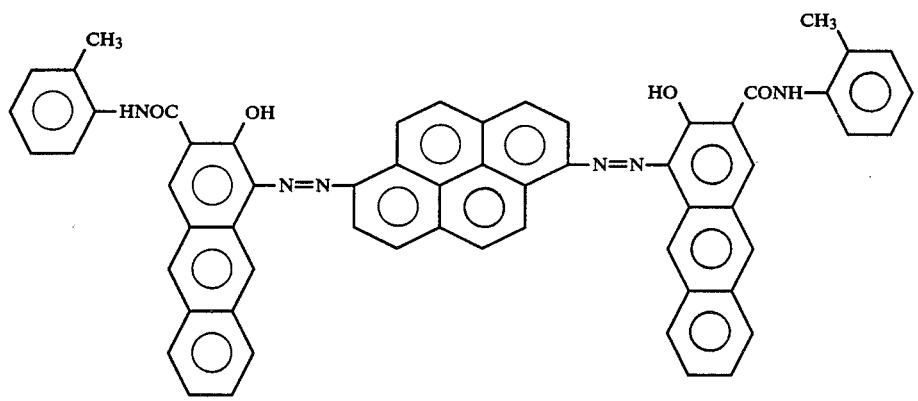 |
| 1-8 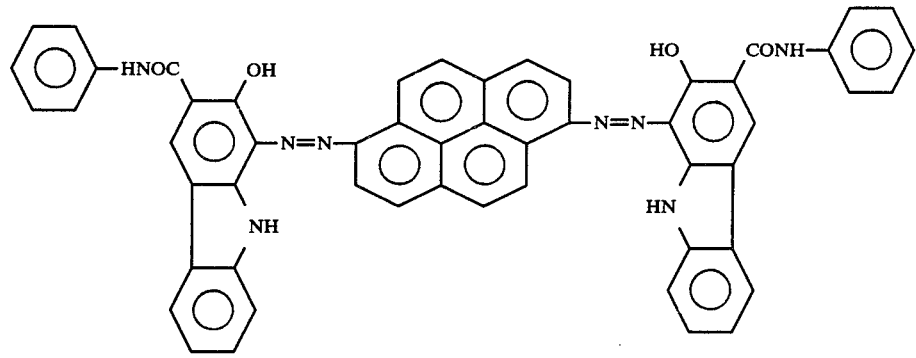 |
| 1-9 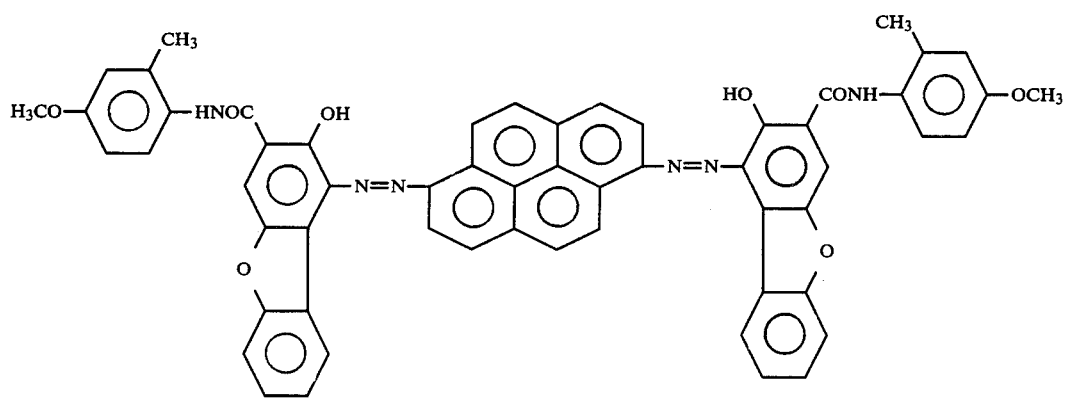 |

-continued
No.
1-10
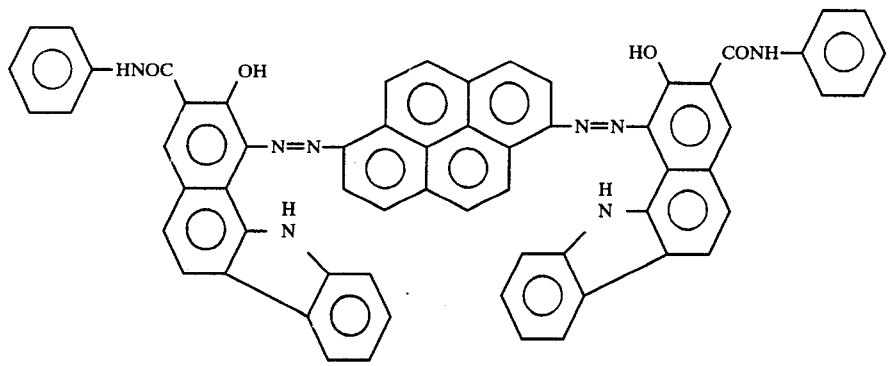
1-11
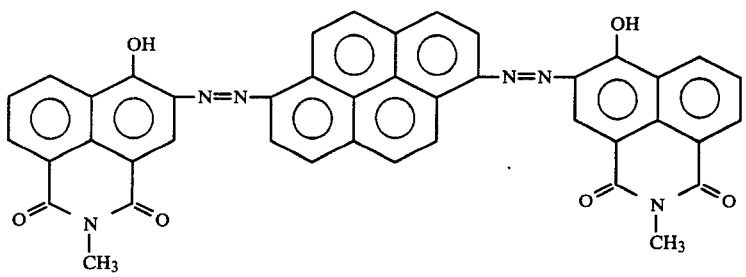
1-12
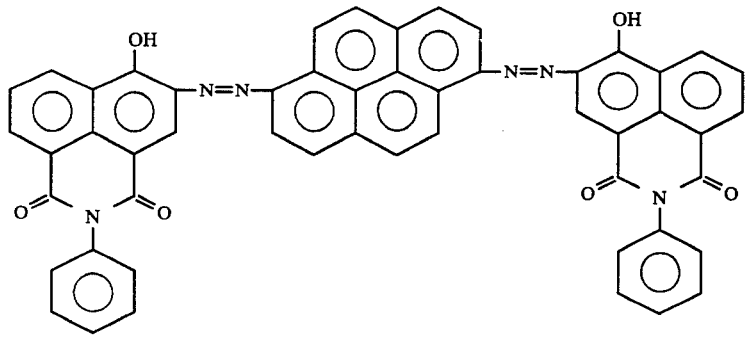
1-13
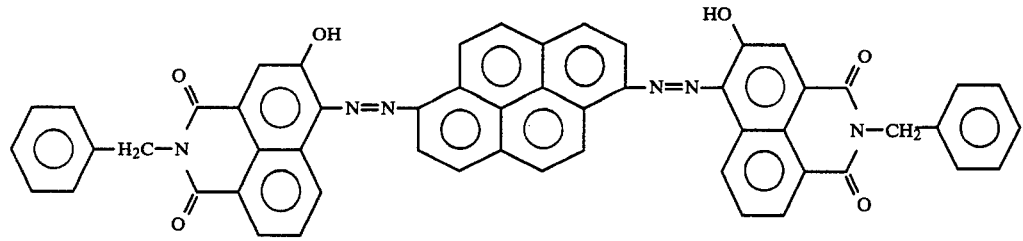
1-14
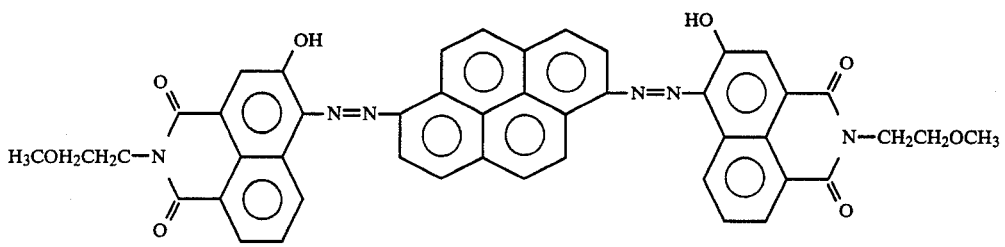

| No. | |
|---|---|
| 1-15 | 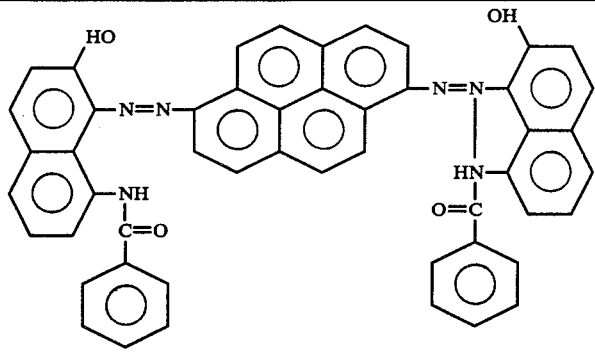 |
| 1-16 | 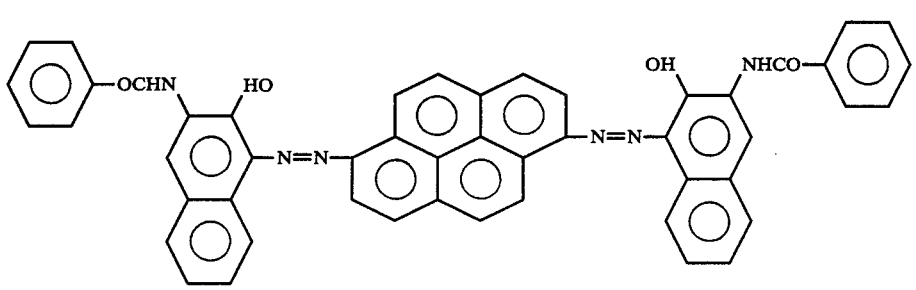 |

These diazo pigments of the formula (1) can be used alone or in combination. These pigments can be readily synthesized by tetrazotizing a diamine of the formula,

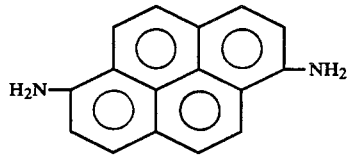

in the ordinary way, and either direct coupling the tetrazonium with a corresponding coupler in the presence of alkali, or once isolating the tetrazonium in the form of fluoroborate or double salt with zinc chloride and thereafter coupling the isolated salt with the coupler in a suitable solvent, e.g. N,N-dimethylformamide or dimethylsulfoxide, in the presence of alkali.

The following are typical examples of the process for synthesizing the disazo pigment of the formula (1) used in the present invention.

PREPARATION EXAMPLE 1

(Synthesis of diazo pigment No. 1-1 listed above)

In a 500-ml beaker were placed 80 ml of water, 16.6 ml (0.19 mole) of conc. HCl, and 6.7 g (0.029 mole) of

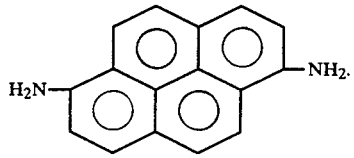

The mixture was cooled in ice-cold water bath to 3° C. while stirring. Then a solution of 4.2 g (0.061 mole) of sodium nitrite in 7 ml of water was added dropwise to the mixture during 10 minutes while keeping the liquid temperature in the range of 3°-10° C. Thereafter the stirring was continued for 30 minutes at the same temperatures. After addition of carbon, the reaction mixture was filtered to give a tetrazonium solution.

Then a coupler solution was prepared by dissolving 21 g (0.53 mole) of sodium hydroxide and then 16.2 g of naphthol AS (3-hydroxy-2-naphthoic acid anilide) in 700 ml of water contained in a 2-l beaker.

This coupler solution, cooled to 6° C., was added dropwise to the tetrazonium solution over 30 minutes with stirring while controlling the liquid temperature at 6°-10° C. The mixture was further stirred for 2 hours at room temperature and then allowed to stand overnight. The resulting precipitate was filtered and washed with water, giving 20.4 g of a crude pigment. This pigment was hot-filtered with 400 ml of N,N-dimethylformamide 5 times, and hot-dried in vacuo, giving 19.2 g of the objective pigment purified, yield 84.8%.

Analysis: Calculated (%): C, 76.90; H, 4.14; N, 10.76. Found (%): C, 76.73; H, 4.30; N, 10.62.

PREPARATION EXAMPLE 2

(Synthesis of disazo pigment No. 1-2 listed above)

A solution of 3.54 g (0.051 mole) of sodium nitrite in 10.6 ml of water was added dropwise to a solution of 5.81 g (0.025 mole) of

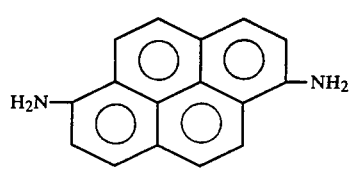

in a mixture of 65 ml of water and 13.24 ml (0.15 mole) of conc. HCl during 5 minutes with stirring while keeping the liquid temperature at 4.5°-7° C. The stirring was further continued for 30 minutes at the same temperatures.

The resulting tetrazonium solution was added dropwise to a solution of 10.57 g (0.0525 mole) of 3-hydroxynaphthalene-2-carboxylic acid methylamide and 16.8 g (0.42 mole) of sodium hydroxide in 420 ml of water during 10 minutes with stirring while keeping the liquid temperature at 4°-10° C. The mixture was further stirred for 2 hours at the same temperatures and then allowed to stand overnight.

The resulting precipitate was filtered, washed with water, dried, and treated with methyl ethyl ketone in a Soxhlet extractor for 2.0 hours, and 13.1 g of the dry objective pigment was obtained, yield 79.8%.

Analysis: Calculated (%): C, 73.15; H, 4.31; N, 12.80. Found (%): C, 72.96; H, 4.28; N, 13.01.

PREPARATION EXAMPLE 3

(Synthesis of disazo pigment No. 1-5 listed above)

A coupler solution was prepared by dissolving 21 g (0.53 mole) of sodium hydroxide and then 21.6 g (0.061 mole) of 3-hydroxynaphthalene-2-carboxylic acid N,N-diphenylhydrazide in 700 ml water contained in a 2-l beaker.

This coupler solution, cooled to 6° C., was added dropwise to a tetrazonium solution prepared in the same manner as in Preparation Example 1, over 30 minutes with stirring while keeping the liquid temperature at 6°-10° C. Thereafter the mixture was further stirred for 2 hours at room temperature and allowed to stand overnight. The resulting precipitate was filtered and washed with water, giving 25.8 g of a crude pigment. This pigment was hot-filtered with 400 ml of N,N-dimethylformamide 5 times, and hot dried in vacuo, giving 24.6 g of the objective pigment purified, yield 88.2%.

Analysis: Calculated (%): C, 77.31; H, 4.40; N, 11.64. Found (%): C, 77.41; H, 4.31; N, 11.62.

Other disazo pigments represented by the formula (1) can be synthesized in the same manner as stated above.

Disazo pigments of the formula (2):

| No. | |
|---|---|
| 2-1 | 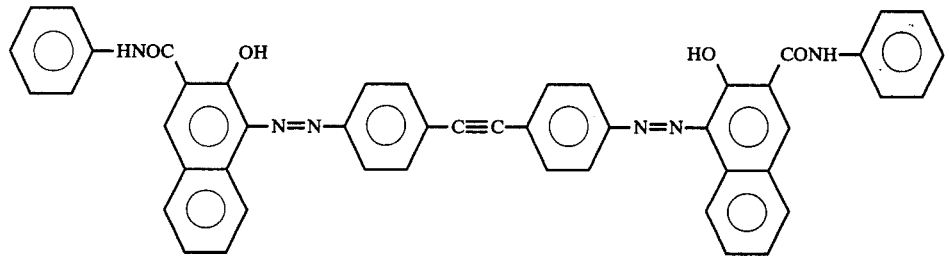 |
| 2-2 | 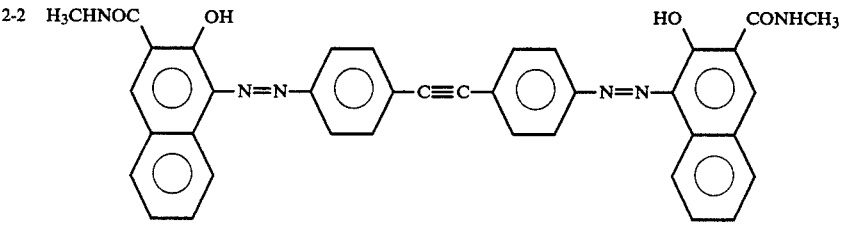 |
| 2-3 | 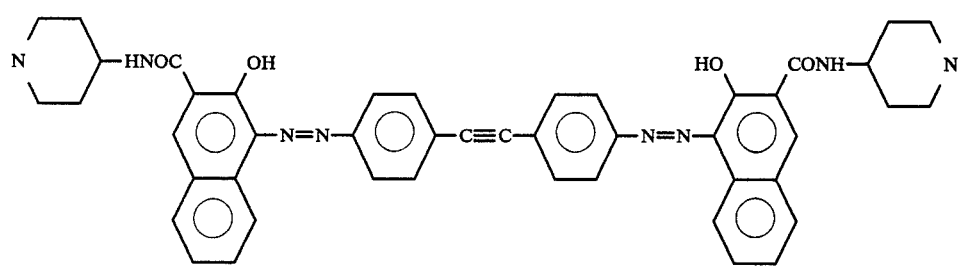 |
| 2-4 | 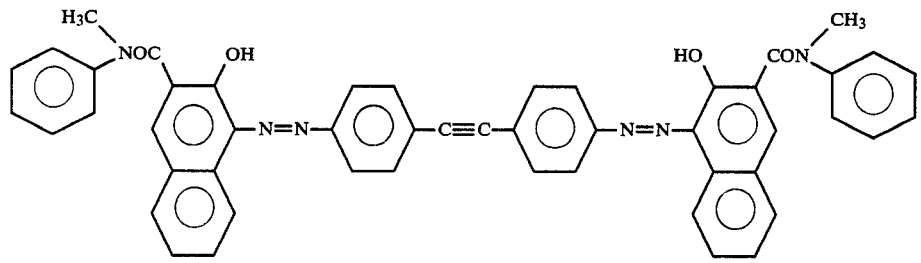 |

| No. |
|---|
| 2-5 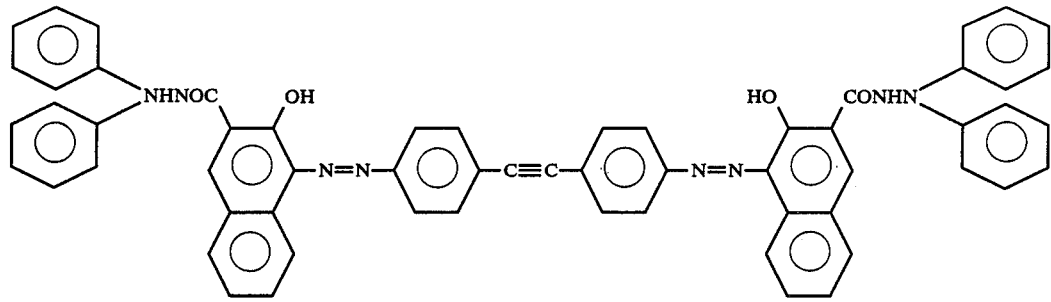 |
| 2-6 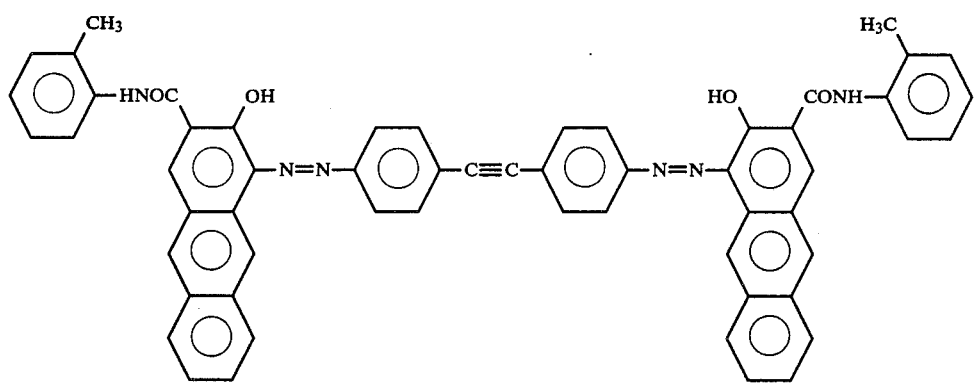 |
| 2-7 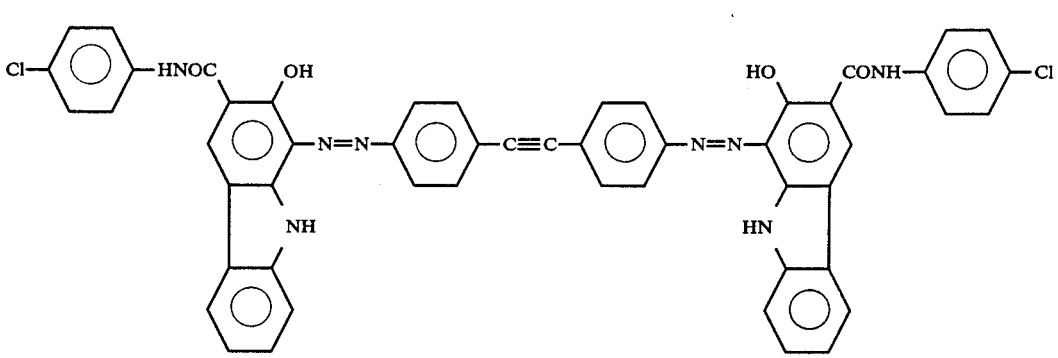 |
| 2-8 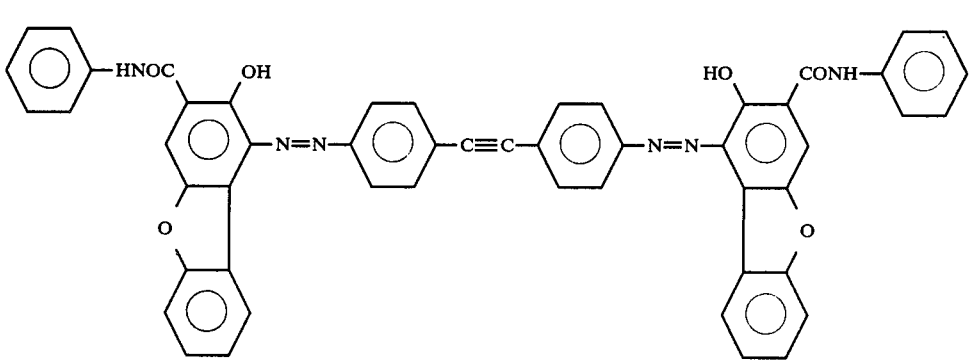 |

-continued
| No. |
| --- |
| 2-9 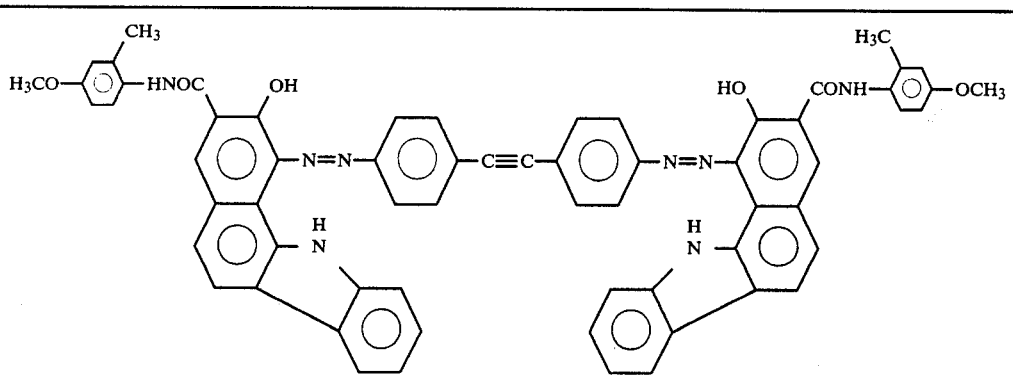 |
| 2-10 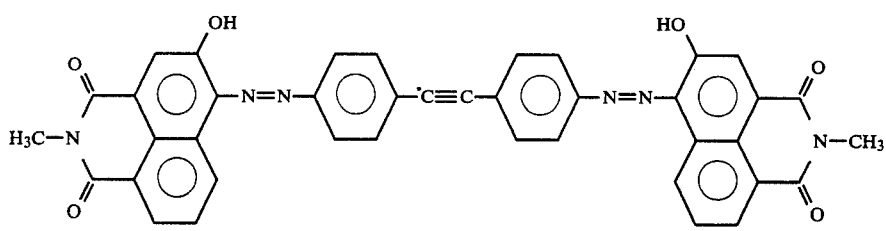 |
| 2-11 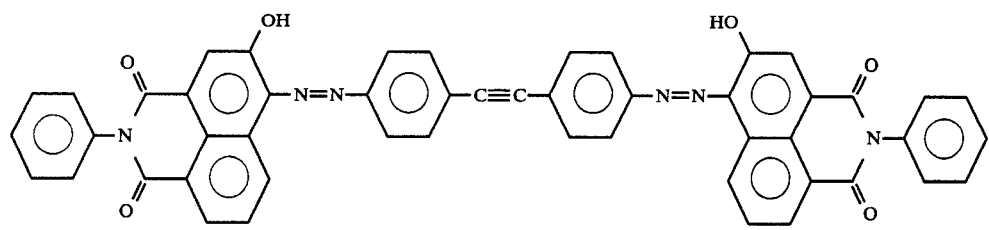 |
| 2-12 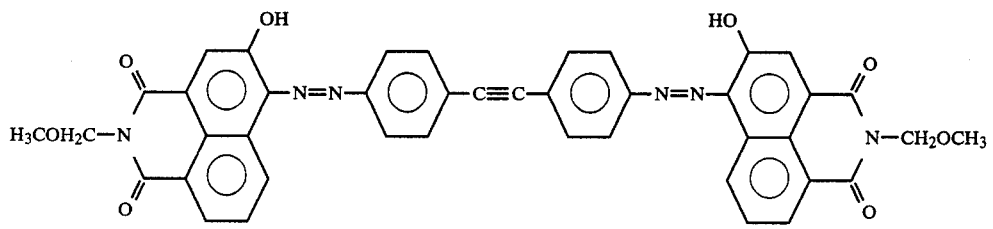 |
| 2-13 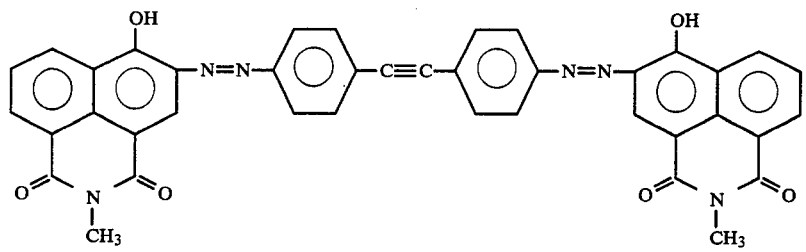 |
| 2-14 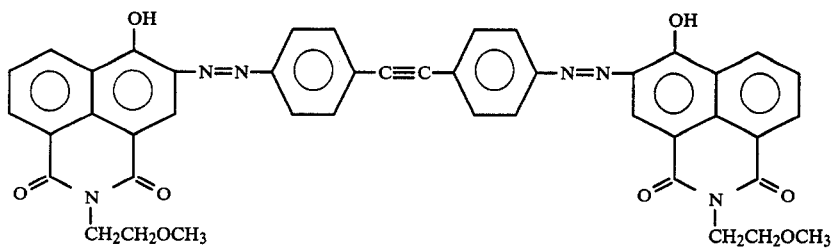 |

| No. | |
|---|---|
| 2-15 | 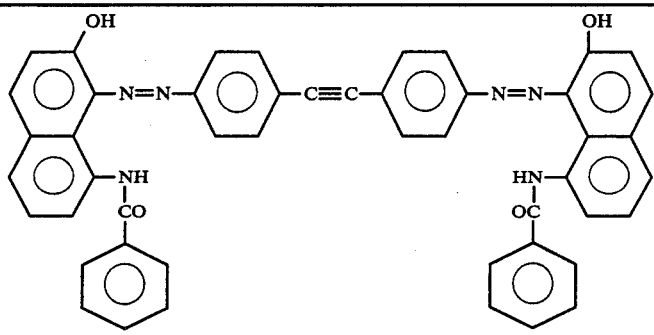 |

These disazo pigments of the formula (2) can be used alone or in combination. These pigments can be readily synthesized, for example, by tetrazotizing a diamine of the formula

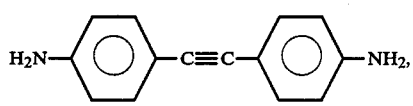

in the ordinary way, and either direct coupling the tetrazonium with a corresponding coupler in the presence of alkali or once isolating the tetrazonium in the form of fluoroborate or double salt with zinc chloride and thereafter coupling the isolated salt with the coupler in a suitable solvent, e.g. N,N-dimethylformamide, dimethylsulfoxide or the like, in the presence of alkali.

The following are typical examples of the process for synthesizing the disazo pigment of the formula (2) used in the invention.

PREPARATION EXAMPLE 4

(Synthesis of disazo pigment No. 2-1 listed above)

In a 500-ml beaker were placed 80 ml of water, 16.6 ml (0.19 mole) of conc. HCl, and 6.04 g (0.029 mole) of

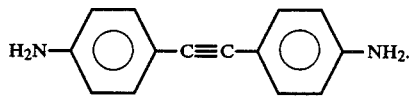

The mixture was cooled to 3° C. in ice-cold water bath while stirring. Then a solution of 4.2 g (0.061 mole) of sodium nitrite in 7 ml of water was added dropwise to the mixture during 10 minutes while keeping the liquid temperature in the range of 3°–10° C. Thereafter the stirring was continued for 30 minutes at the same temperatures. The reaction mixture, after addition of carbon, was filtered to give a tetrazonium solution.

Next a coupler solution was prepared by dissolving 21 g (0.53 mole) of sodium hydroxide and then 16.2 g (0.061 mole) of naphthol AS (3-hydroxy-2-naphthoic acid anilide) in 700 ml of water contained in a 2-l beaker.

This coupler solution, cooled to 6° C., was added dropwise to the tetrazonium solution over 30 minutes with stirring while controlling the liquid temperature at 6°–10° C. The mixture was further stirred for 2 hours at room temperature and then allowed to stand overnight. The resulting precipitate was filtered and washed with water, giving 19.6 g of a crude pigment. This pigment was hot-filtered with 400 ml of N,N-dimethylformamide 5 times, and hot-dried in vacuo, giving 18.1 g of the objective pigment purified, yield 82.5%.

Analysis: Calculated (%): C, 76.17; H, 4.27; N, 11.11. Found (%): C, 76.14; H, 4.31; N, 11.23.

PREPARATION EXAMPLE 5

(Synthesis of disazo pigment No. 2-2 listed above)

A solution of 3.54 g (0.051 mole) of sodium nitrite in 10.6 ml of water was added dropwise to a solution of 5.21 g (0.025 mole) of

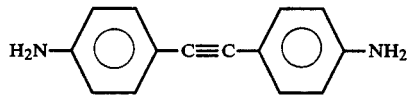

in a mixture of 65 ml of water and 13.24 ml (0.15 mole) of conc. HCl during 5 minutes with stirring while keeping the liquid temperature at 4.5°–7° C. The stirring was further continued for 30 minutes at the same temperatures.

The resulting tetrazonium solution was added dropwise to a solution of 10.57 g (0.0525 mole) of 3-hydroxynaphthalene-2-carboxylic acid methylamide and 16.8 g (0.42 mole) of sodium hydroxide in 420 ml of water during 10 minutes with stirring while keeping the liquid temperature at 4°–10° C. The mixture was further stirred for 2 hours at the same temperatures and then allowed to stand overnight.

The resulting precipitate was filtered, washed with water, dried, and treated with methyl ethyl ketone in a Soxhlet extractor for 2.0 hours, and 13.6 g of the dry objective pigment was obtained, yield 86.0%.

Analysis: Calculated (%): C, 72.13; H, 4.47; N, 13.29. Found (%): C, 71.91; H, 4.45; N, 13.25.

PREPARATION EXAMPLE 6

(Synthesis of disazo pigment No. 2-5 listed above)

A coupler solution was prepared by dissolving 21 g (0.53 mole) of sodium hydroxide and then 21.6 g (0.061 mole) of 3-hydroxynaphthalene-2-carboxylic acid N,N-diphenylhydrazide in 700 ml of water contained in a 2-l beaker.

This coupler solution, cooled to 6° C., was added dropwise to a tetrazonium solution prepared in the same manner as in Preparation Example 4, over 30 minutes with stirring while keeping the liquid temperature at 6°–10° C. Thereafter the mixture was further stirred for 2 hours at room temperature and allowed to stand overnight. The resulting precipitate was filtered and washed with water, giving 22.2 g of a crude pigment. This pigment was hot-filtered with 400 ml of N,N-dimethylformamide 5 times, and hot-dried in vacuo, giving 19.6 g of the objective pigment purified, yield 73.9%.

Analysis: Calculated (%): C, 76.12; H, 4.64; N, 12.25. Found (%): C, 76.04, H, 4.68; N, 12.36.

Other disazo pigments represented by the formula (2) can be synthesized in the same manner as stated above.

Disazo pigments of the formula (3):

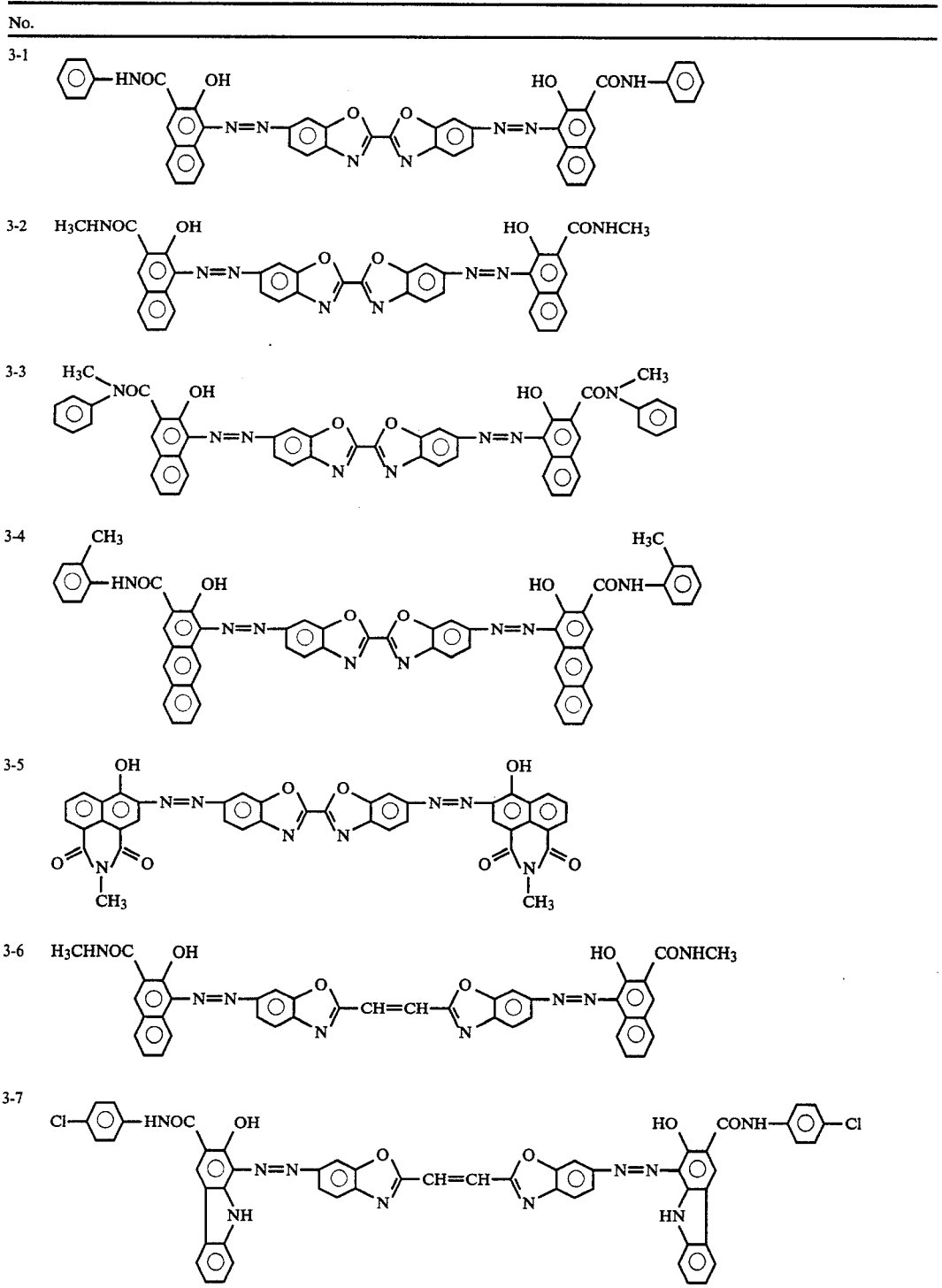

-continued
| No. | |
|---|---|
| 3-8 | 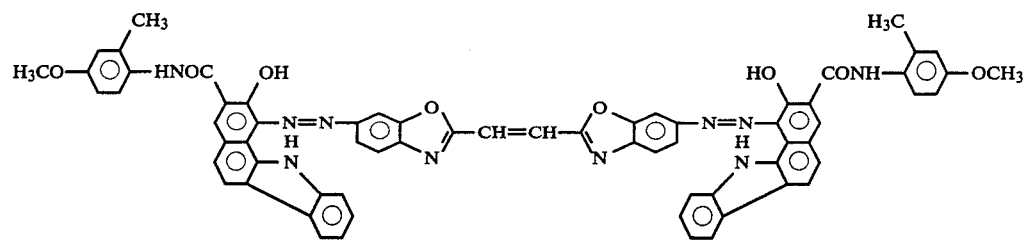 |
| 3-9 | 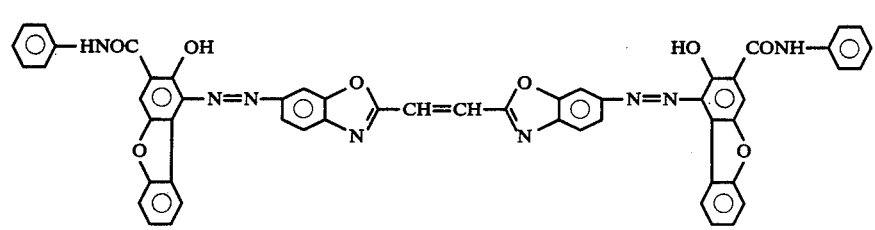 |
| 3-10 | 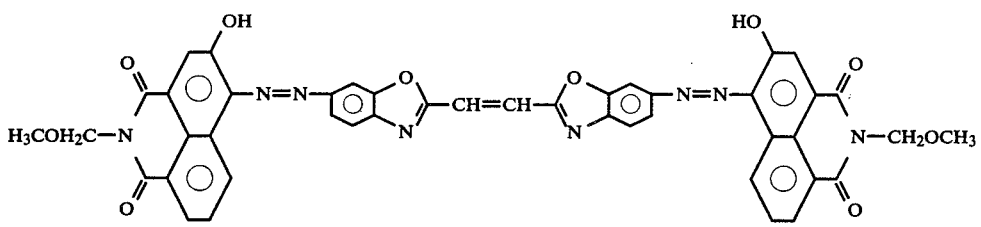 |
| 3-11 | 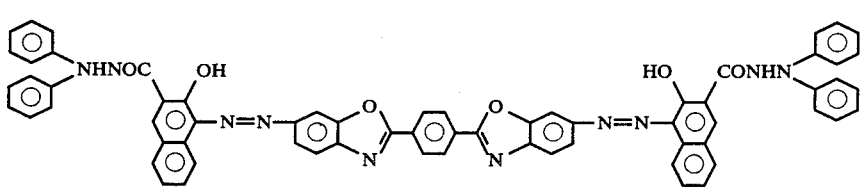 |
| 3-12 | 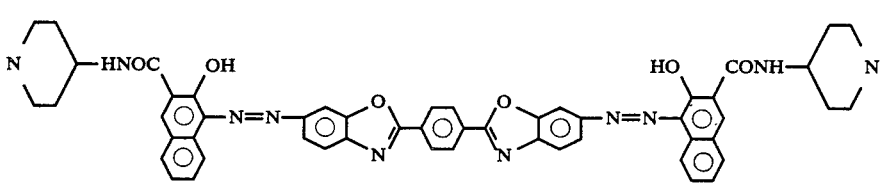 |
| 3-13 | 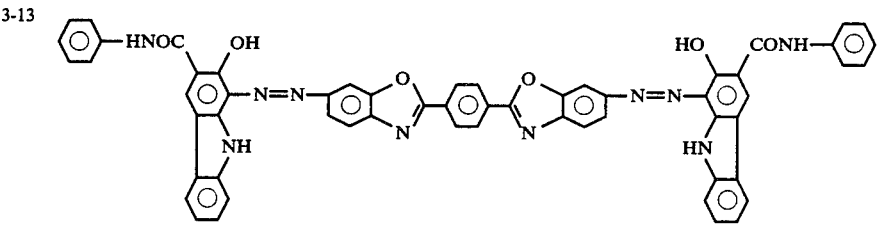 |
| 3-14 | 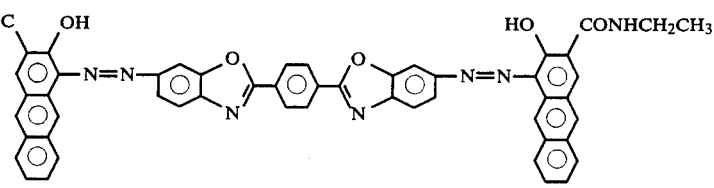 |

| No. | |
|---|---|
| 3-15 | 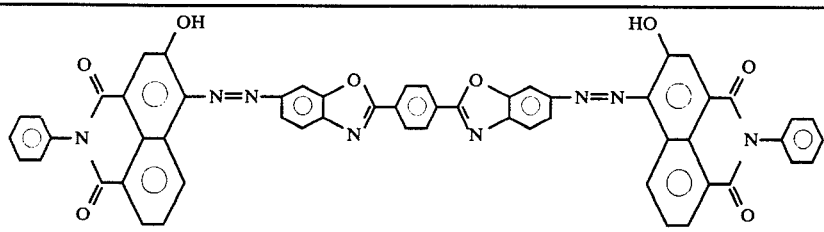 |
| 3-16 | 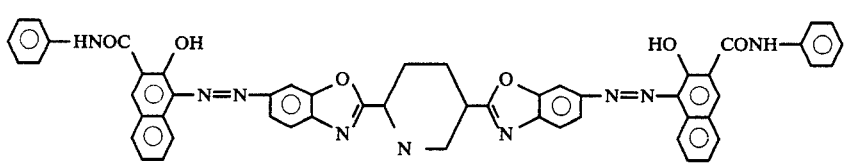 |
| 3-17 | 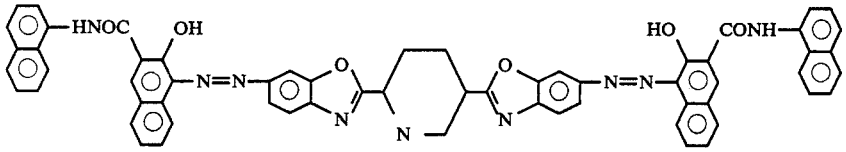 |
| 3-18 | 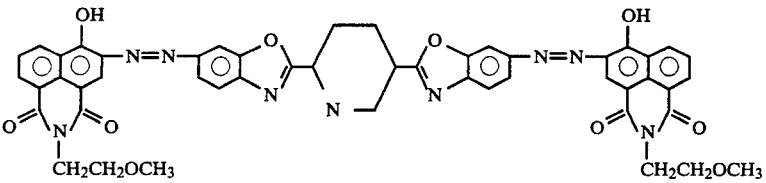 |
| 3-19 | 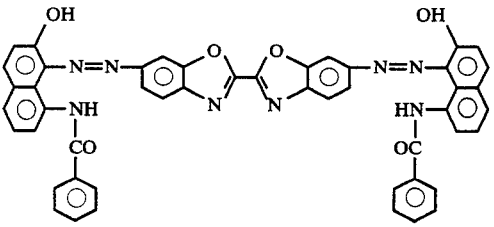 |

These disazo pigments represented by the formula (3) can be used alone or in combination. These pigments can be readily synthesized, for example, by tetrazotizing a diamine of the general formula

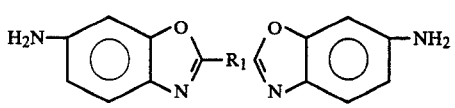

[$R_1$ is the same meaning as defined in the formula (1)], in the ordinary way, and either direct coupling the tetrazonium with the corresponding coupler in the presence of alkali or once isolating the tetrazonium in the form of fluoroborate or double salt with zinc chloride and thereafter coupling the isolated salt with the coupler in a suitable solvent, e.g. N,N-dimethylformamide dimethylsulfoxide or the like, in the presence of alkali.

The following are typical examples of the process for synthesizing the disazo pigment of the formula (3) used in the invention.

PREPARATION EXAMPLE 7

(Synthesis of disazo pigment No. 3-1 listed above)

In a 500-ml beaker were placed 80 ml of water, 16.6 ml (0.19 mole) of conc. HCl, and 7.72 g (0.029 mole) of

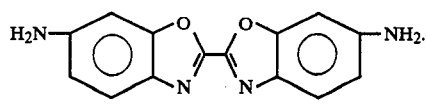

The mixture was cooled to 3° C. in ice-cold water bath while stirring. Then a solution of 4.2 g (0.061 mole) of sodium nitrite in 7 ml of water was added dropwise to the mixture during 10 minutes while keeping the liquid temperature in the range of 3°–10° C. Thereafter the stirring was continued for 30 minutes at the same temperatures. The reaction mixture, after addition of carbon, was filtered to give a tetrazonium solution.

Next a coupler solution was prepared by dissolving 21 g (0.53 mole) of sodium hydroxide and then 16.2 g (0.061 mole) of naphthol AS (3-hydroxy-2-naphthoic acid anilide) in 700 ml of water contained in a 2-l beaker.

This coupler solution, cooled to 6° C., was added dropwise to the tetrazonium solution over 30 minutes with stirring while controlling the liquid temperature at 6°-10° C. The mixture was further stirred for 2 hours at room temperature and then allowed to stand overnight. The resulting precipitate was filtered and washed with water, giving 20.1 g of a crude pigment. This pigment was hot-filtered with 400 ml of N,N-dimethylformamide 5 times, and hot-dried in vacuo, giving 17.7 g of the objective pigment purified, yield 74.7%.

Analysis: Calculated (%): C, 70.75; H, 3.72; N, 13.75. Found (%): C, 70.81; H, 3.69; N, 13.77.

PREPARATION EXAMPLE 8

(Synthesis of disazo pigment No. 3-6 listed above)

A solution of 3.54 g (0.051 mole) of sodium nitrite in 10.6 ml of water was added dropwise to a solution of 7.31 g (0.025 mole) of

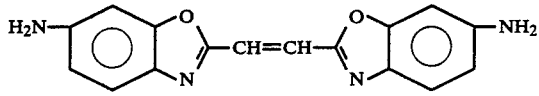

in a mixture of 65 ml of water and 13.24 ml (0.15 mole) of conc. HCl during 5 minutes with stirring while keeping the liquid temperature at 4.5°-7° C. The stirring was further continued for 30 minutes at the same temperatures.

The resulting tetrazonium solution was added dropwise to a solution of 10.57 g (0.0525 mole) of 3-hydroxynaphthalene-2-carboxylic acid methylamide and 16.8 g (0.42 mole) of sodium hydroxide in 420 ml of water during 10 minutes with stirring while keeping the liquid temperature at 4°-10° C. The mixture was further stirred for 2 hours at the same temperatures and then allowed to stand overnight.

The resulting precipitate was filtered, washed with water, dried, and treated with methyl ethyl ketone in a Soxhlet extractor for 2.0 hours, giving 14.9 g of the objective pigment purified, yield 83.0%.

Analysis: Calculated (%): C, 67.02; H, 3.95; N, 15.64. Found (%): C, 66.89; H, 3.81; N, 15.60.

PREPARATION EXAMPLE 9

(Synthesis of disazo pigment No. 3-11 listed above)

A solution of 4.2 g (0.061 mole) of sodium nitrite in 7 ml of water was added dropwise to a solution of 9.93 g (0.029 mole) of

in a mixture of 80 ml of water and 16.6 ml (0.19 mole) of conc. HCl during 10 minutes with stirring while keeping the liquid temperature at 2°-5° C. Thereafter the stirring was continued for 30 minutes at the same temperatures. The reaction mixture, after addition of carbon, was filtered to give a tetrazonium solution.

Next a coupler solution was prepared by dissolving 21 g (0.53 mole) of sodium hydroxide and then 21.6 g (0.061 mole) of 3-hydroxynaphthalene-2-carboxylic acid N,N-diphenylhydrazide in 700 ml of water contained in a 2-l beaker.

This coupler solution, cooled to 6° C., was added dropwise to the tetrazonium solution over 30 minutes with stirring while controlling the liquid temperature at 6°-10° C. The mixture was further stirred for 2 hours at room temperature and then allowed to stand overnight. The resulting precipitate was filtered and washed with water, giving 29.5 g of a crude pigment. This pigment was hot-filtered with 400 ml of N,N-dimethylformamide 5 times and hot-dried in vacuo, giving 26.3 g of the objective pigment purified, yield 84.6%.

Analysis: Calculated (%): C, 73.86; H, 4.14, N, 13.05. Found (%): C, 73.69; H, 4.06; N, 13.08.

Other disazo pigments of the formula (3) can be synthesized in the same manner as stated above though the experiments are disclosed for specific three compounds.

In a preferred embodiment of the invention, the organic photoconductive material of the formula (1)-(3) is used as a charge-generating material for the electrophotographic photosensitive member which has two photosensitive layers functioning respectively as a charge generation layer and as a charge transport layer.

It is desirable that the charge generation layer contain the above organic photoconductive material as much as possible to absorb a sufficient quantity of light and additionally be as thin as 5 μm or less, preferably 0.01-10 μm, for the purpose of keeping short the distance necessary for generated charge carriers to reach the charge transport layer. This is because the charge generation layer needs to absorb most of the incident light and generate many charge carriers and further because the generated charge carriers need to be injected into the charge transport layer without being deactivated by the recombination or trapping the charge carriers.

The charge generation layer can be formed on a substrate by coating a dispersion of the above organic photoconductive material in a suitable binder solution or by vapor deposition of the organic photoconductive material in a vacuum deposition apparatus. The binder used for the coating can be selected from a wide variety of dielectric resins and from organic photoconductive polymers such as poly(N-vinylcarbazole), polyvinylanthracene, and polyvinylpyrene. Preferred examples of the binder are dielectric resins such as poly(vinyl butyral), polyarylate (e.g. a bisphenol A-phthalic acid polycondensate), polycarbonate, polyester, phenoxy resin, poly(vinyl acetate), acrylic resin, polyacrylamide resin, polyamide, polyvinylpyridine, cellulosic resin, urethane resin, epoxy resin, casein, poly(vinyl alcohol), and polyvinylpyrrolidone. The content of the binder resin in the charge generation layer is up to 80%, preferably up to 40%, by weight.

The solvent used for the coating varies depending upon the kind of binder resin employed and is desirably selected from those which do not dissolve the charge transport layer or subbing layer, which will be described layer. Examples of the solvent usable are; alcohols such as methanol, ethanol, isopropanol and etc.; ketones such as acetone, methyl ethyl ketone, cyclohexanone and etc.; amides such as N,N-dimethylformamide N,N-dimethylacetamide and etc.; sulfoxides such as dimethylsulfoxide and etc.; ethers such as tetrahydrofuran, dioxane, ethylene glycol monomethyl ether and etc.; esters such as methyl acetate, ethyl acetate and etc.; halogenated aliphatic hydrocarbons such as chloroform, methylene chloride, dichloroethylene, carbon tetrachloride, trichloroethylene and etc.; and aromatic hydrocarbons or halogenated derivatives thereof such as benzene, toluene, xylene, ligroin, monochlorobenzene, dichlorobenzene and etc.

The coating can be carried out by dip coating, spray coating, spinner coating, bead coating, Meyer bar coating, blade coating, roller coating, curtain flow coating, etc. The applied coating composition is favorably heat-dried after setting for finger touch at room temperature. The heat drying can be accomplished at temperatures of 30°–200° C. for a period of 5 minutes to 2 hours, with or without blowing air.

The charge transport layer is electrically connected to the charge generation layer and has the function of receiving the charge carriers injected from the charge generation layer in an electric field and the function of transporting these charge carriers to its surface. The charge transport layer may be positioned on either the upper or lower side of the charge generation layer, but preferably on the upper side.

Since photoconductive materials generally have the function of transporting charge carriers, the charge transport layer can be formed of such a photoconductive material.

The photoconductive material capable of transporting charge carriers in the charge transport layer (hereinafter this material is simply referred to as a charge-transporting material) is desired to be substantially nonresponsive to the electromagnetic waves of wavelengths to which the charge generation layer is responsive. The term "electromagnetic waves" means rays of light, in a broad sense, including γ-rays, x-rays, ultraviolet rays, visible rays, infrared rays, far infrared rays, etc. When the wavelength region of the rays to which the charge transport layer is responsive coincides with or overlaps that of the rays to which the charge generation layer is responsive, charge carriers generated in one of the layers will trap those generated in the other layer, thus resulting in the deterioration of the sensitivity.

Charge-transporting materials involve electron-transporting materials and hole-transporting materials. Electron-transporting materials include electron attractive substances, e.g. chloranil, bromanil, tetracyanoethylene, tetracyanoquinodimethane, 2,4,7-trinitro-9-fluorenone, 2,4,5,7-tetranitro-9-fluorenone, 2,4,7-trinitro-9-dicyanomethylenefluorenone, 2,4,5,7-tetranitroxanthone, and 2,4,8-trinitrothioxanthone, and polymers derived these electron attractive substances.

Hole-transporting materials include pyrene; carbazole compounds, e.g. N-ethylcarbazole, N-isopropylcarbazole; hydrazones, e.g., 9-ethylcarbazole-3-aldehyde-N-methyl-N-phenylhydrazone, 9-ethylcarbazole-3-aldehyde-N,N-diphenylhydrazone, 10-ethylcarbazole-3-aldehyde-N,N-diphenylhydrazone, 10-ethylphenoxazine-3-aldehyde-N,N-diphenylhydrazone; p-dialkylaminobenzaldehyde-N,N-diarylhydrazones, e.g., p-diethylaminobenzaldehyde-N,N-diphenylhydrazone, p-diethylaminobenzaldehyde-N-α-naphthyl-N-phenylhydrazone, p-pyrrolidinylbenzaldehyde-N,N-diphenylhydrazone, 1,3,3-trimethylindolenine-ω-aldehyde-N,N-diphenylhydrazone, and p-diethylaminobenzaldehyde-3-methylbenzothiazolinone-2-hydrazone; p-diarylaminobenzaldehyde-N,N-diarylhydrazone, e.g., p-diphenylaminobenzaldehyde-N,N-diphenylhydrazone, p-ditolylaminobenzaldehyde-N,N-diphenylhydrazone, p-dixylylaminobenzaldehyde-N,N-diphenylhydrazone, p-di-(4-chlorophenyl) aminobenzaldehyde-N,N-diphenylhydrazone; p-diarylaminobenzaldehyde-N-aryl-N-alkylhydrazone, e.g., p-diphenylaminobenzaldehyde-N-phenyl-N-methylhydrazone, p-ditolylaminobenzaldehyde-N-phenyl-N-methylhydrazone, p-di-(4-chlorophenyl)-aminobenzaldehyde-N-phenyl-N-methylhydrazone; 2,5-bis(p-diethylaminophenyl)-1,3,4-oxadiazole; pyrazoline compounds, e.g. 1-phenyl-3-(p-diethylaminostyryl)-5-(p-diethylaminophenyl)pyrazoline, 1-[quinolyl (2)]-3-(p-diethylaminostyryl)-5-(p-diethylaminophenyl)pyrazoline, 1-[pyridyl (2)]-3-(p-diethylaminostyryl)-5-(p-diethylaminophenyl)-pyrazoline, 1-[6-methoxypyridyl (2)]-3-(p-diethylaminostyryl)-5-(p-diethylaminophenyl)-pyrazoline, 1-[pyridyl (3)]-3-(p-diethylaminostyryl)-5-(p-diethylaminophenyl)pyrazoline, 1-[lepidyl (2)]-3-(p-diethylaminostyryl)-5-(p-diethylaminophenyl)-pyrazoline, 1-[pyridyl (2)]-3-(p-diethylaminostyryl)-4-methyl-5-(p-diethylaminophenyl)pyrazoline, 1-[pyridyl (2)]-3-(α-methyl-p-diethylaminostyryl)-5-(p-diethylaminophenyl)pyrazoline, 1-phenyl-3-(p-diethylaminostyryl)-4-methyl-5-(p-diethylaminophenyl)pyrazoline, 1-phenyl-3-(α-benzyl-p-diethylaminostyryl)-5-(p-diethylaminophenyl)pyrazoline, and spiropyrazoline; oxazole compounds, e.g. 2-(p-diethylaminostyryl)-6-diethylaminobenzoxazole and 2-(p-diethylaminophenyl)-4-(p-dimethylaminophenyl-5-(2-chlorophenyl)oxazole; thiazole compounds, e.g. 2-(p-diethylaminostyryl)-6-diethylaminobenzothiazole; triarylmethanes, e.g. bis(4-diethylamino-2-methylphenyl)-phenylmethane and etc.; polyarylalkanes, e.g. 1,1-bis(4-N,N-diethylamino-2-methylphenyl) heptane and 1,1,2,2-tetrakis(4-N,N-dimethylamino-2-methylphenyl)ethane and etc.; triphenylamines; triphenylamine; and photoconductive polymers, e.g., poly(N-vinylcarbazole), polyvinylpyrene, polyvinylanthracene, polyvinylacridine, poly(9-vinylphenylanthracene), pyrene-formaldehyde resin, and ethylcarbazole-formaldehyde resin.

Besides these organic compounds, inorganic materials such as selenium, selenium-tellulium, amorphous silicon, and cadmium sulfide can also be used as the charge-transporting materials.

These charge-transporting materials can be used alone or in combination.

When the charge-transporting material to be used does not have the film-forming property, a coating film as the charge transport layer can be formed by combining a suitable binder. Suitable materials for the binder include dielectric resins, e.g. acrylic resin, polyarylate, polyester, polycarbonate, polystyrene, acrylonitrile-styrene copolymer, acrylonitrile-butadiene copolymer, poly(vinyl butyral), poly(vinyl formal), polysulfone, polyacrylamide, polyamide, and chlorinated rubber; and organic photoconductive polymers, e.g. poly(N-vinylcarbazole), polyvinylanthracenes, and polyvinylpyrene.

The charge transport layer cannot be made thicker than is necessary since the charge carrier transport distance therein is limited. Thickness of the layer ranges generally from 5 to 30 μm, preferably from 8 to 20 μm. Suitable coating methods as mentioned before can be applied to form the charge transport layer by coating.

A photosensitive laminate comprising the above charge generation and charge transport layers is laid on an electrically conductive substrate. Such conductive substrates include; sheets or sheet-like materials (e.g. a hollow cylinder) having the conductivity in themselves, e.g. aluminum, aluminum alloy, copper, zinc, stainless steel, vanadium, molybdenum, chromium, titanium, nickel, indium, gold, and platinum; those of plastics [e.g. polyethylene, polypropylene, poly(vinyl chloride), poly(ethylene terephthalate), acrylic resin, and polyfluoroethylene] having a conductive coating layer formed by vacuum deposition of aluminum, aluminum alloy, indium oxide, tin oxide, indium oxide-tin oxide alloy, or the like; those of plastics coated with conductive particles, e.g. carbon black or silver particles, using a binder; those of plastics or paper impregnated with conductive particles; and those of plastics coated with a conductive polymer.

A subbing layer which functions as a barrier and as an adhesive can be laid between the conductive substrate and the photosensitive laminate. The subbing layer can be formed of casein, poly(vinyl alcohol), nitrocellulose, ethylene-acrylic acid copolymer, polyamide (nylon 6, nylon 66, nylon 610, copolymerized nylon, or alkoxymethylated nylon), polyurethane, gelatin, or aluminum oxide. Thickness of the subbing layer ranges generally from 0.1 to 5 μm, preferably from 0.5 to 3 μm.

In order to operate a photosensitive member made by laminating a conductive substrate a charge generation layer and a charge transport layer in this order, it is necessary to provide positive electric charge onto the surface of the charge transport layer when the charge-transporting material is electron-transporting. On image-exposing the photosensitive member positively charged, electrons liberated in the charge generation layer, in the exposed region, are injected into the charge transport layer, then arrive at the surface, and neutralize the positive charge to decay the surface potential, thus forming an electrostatic contrast between the exposed and unexposed regions. The electrostatic latent image can be visualized by the development with a negative-working toner. This toner image can be fixed either directly or after being transferred onto paper or plastic film.

Alternatively, an image can be developed and fixed on a member after being transferred latent toner image. Another possible method is to transfer the electrostatic latent image from the photosensitive member onto the dielectric layer of transfer paper, and develop and fix the transferred image. Any known developing agents and any known development and fixing processes may be adopted; there are no particular restrictions thereupon.

On the other hand, when the charge-transporting material is hole-transporting, the surface of the charge transport layer needs to be given negative electric charge for the operation. On image-exposing the photosensitive member negatively charged, holes generated in the charge generation layer, in the exposed resion, are injected into the charge transport layer, then arrive at the surface, and neutralize the negative charge to decay the surface potential, thus forming an electrostatic contrast between the exposed and unexposed regions. For the development a positive-working toner needs to be used contrary to the case with an electron-transporting material.

Another embodiment of the invention is an electrophotographic photosensitive member which comprises a photosensitive layer containing the organic photoconductive material of the formula (1)–(3) together with a charge-transporting material. In this case, a charge-transfer complex consisting of poly(N-vinylcarbazole) and trinitrofluorenone, can be employed singly or in combination with the charge-transporting material.

This type of electrophotographic photosensitive member can be prepared by dispersing the organic photoconductive material and above charge-transfer complex in a tetrahydrofuran solution of a polyester, and forming a coating film from the resulting dispersion.

In any photosensitive member of the invention, at least one pigment selected from the disazo pigments represented by the formula (1)–(3) is used; if necessary, the pigment can be used cojointly either with another type of pigment different in the light absorption spectrum to enhance the sensitivity of the photosensitive member, or with another pigment of the formula (1)–(3) or with another charge-generating material selected from known dyes and pigments, for the purpose of obtaining a panchromatic photosensitive member or for some other purpose.

The electrophotographic photosensitive member containing the organic photoconductive material of the present invention can be used not only for electrophotographic copying machines but also over a wide field of electrophotographic applications such as those to laser printers and CRT printers.

The organic photoconductive material of the present invention can also be used for solar cells and photo-sensors, besides for the above electrophotographic photosensitive members. Solar cells can be made, for instance, by sandwiching the organic photoconductive material between indium oxide and aluminum layers.

According to the electrophotographic photosensitive members of the present invention, at the 5000th of the repetition processes the electric potential at the light portion could be controlled twice or lower as that of the initial operation, the repetition process comprising sequent steps of charging electricity, exposing to a light for forming image, developing the image, transferring to form toner image, exposing to a light for discharging and cleaning.

The invention is illustrated in more detail with reference to the following Examples:

EXAMPLE 1

A solution of casein in aqueous ammonia (casein 11.2 g, 28% aqueous ammonia 1 g, water 222 ml) was applied on an aluminum plate by means of a Meyer bar so as to give a dry thickness of 1.0 μm and was dried to form a subbing layer.

Then, 5 g of the above disazo pigment No. 1-1, an organic photoconductor, was dispersed in a solution of 2 g of a vinyl butyral resin (degree of butyral conversion 63 mole%) in 95 ml of ethanol by grinding in an attritor for 2 hours. The resulting dispersion was applied on the casein layer by means of a Meyer bar so as to give a dry thickness of 0.5 μm and was dried to form a charge generation layer.

Then, 5 g of a hydrazone of the formula

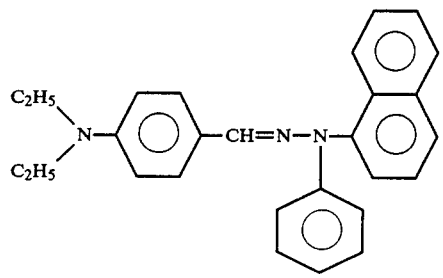

and 5 g of a poly(methyl methacrylate) resin (number average mol. wt. 100,000) were dissolved in 70 ml of benzene and applied on the charge generation layer by means of a Meyer bar so as to give a dry thickness of 12 μm and was dried to form a charge transport layer.

The thus prepared electrophotographic photosensitive member was corona-charged at −5 KV in the static fashion by using an electrostatic copying paper testing machine (Model SP-428, made by Kawaguchi Denki Co., Ltd.), then was retained for 10 seconds in the dark, and exposed to light at an intensity of 5 lux, to examine charge bearing characteristics of the photosensitive member.

The charge bearing characteristics measured were the surface potential (Vo) developed on the photosensitive member by the corona charging and the exposure quantity (E ½) for halving the potential to which the potential Vo decayed for 1 second in the dark.

For further measurement of variations in the light portion and dark portion potentials during repeated operations, the photosensitive member was attached around the cylinder of an electrophotographic copying machine which was provided with a −5.6 KV corona charger, optical system for 10-lux·sec. light exposure, developing device, charger for transfer copying, optical system for light exposure to eliminate the residual charge, and cleaner. Thus this copying machine forms an image on a sheet of transfer paper for each revolution of the cylinder. Using this copying machine, the light portion potential ($V_L$) and dark portion potential ($V_D$) were determined at the initial charging and at the 5000th charging in continuous repeated operations. Results of these tests were as follows:

Vo: −605 V

E ½: 5.2 lux·sec $V_D$ at initial charging: −610 V $V_L$ at initial charging: −25 V $V_D$ at 5000th charging: −595 V $V_L$ at 5000th charging: −40 V

EXAMPLES 2–46

Electrophotographic photosensitive members were prepared in the same manner as in Example 1 but using the above listed disazo pigment Nos. 1-2 to 1-14, 2-1 to 2-18, and 3-1 to 3-14 in place of the disazo pigment No. 1-1.

Results of the same tests for charge bearing characteristics and durability characteristics of these photosensitive members are shown in Table 1.

TABLE 1

| Example No. | Pigment No. | Vo (Volt) | E ½ (lux·sec) | Initial charging $V_D$ (Volt) | Initial charging $V_L$ (Volt) | 5000th charging $V_D$ (Volt) | 5000th charging $V_L$ (Volt) |
|---|---|---|---|---|---|---|---|
| 2 | 1-2 | −615 | 4.4 | −600 | −30 | −580 | −40 |
| 3 | 1-3 | −605 | 5.6 | −595 | −55 | −595 | −65 |
| 4 | 1-4 | −590 | 5.5 | −605 | −50 | −600 | −50 |
| 5 | 1-5 | −605 | 4.0 | −600 | −25 | −590 | −30 |
| 6 | 1-6 | −595 | 4.8 | −610 | −35 | −595 | −45 |
| 7 | 1-7 | −615 | 5.0 | −600 | −50 | −590 | −65 |
| 8 | 1-8 | −600 | 4.2 | −590 | −25 | −575 | −35 |
| 9 | 1-9 | −600 | 5.3 | −620 | −50 | −610 | −50 |
| 10 | 1-10 | −585 | 4.1 | −600 | −20 | −590 | −40 |
| 11 | 1-11 | −600 | 4.5 | −605 | −25 | −585 | −30 |
| 12 | 1-12 | −610 | 3.9 | −595 | −20 | −580 | −45 |
| 13 | 1-13 | −590 | 5.4 | −600 | −40 | −585 | −45 |
| 14 | 1-14 | −605 | 5.8 | −610 | −65 | −600 | −65 |
| 15 | 2-1 | −620 | 4.5 | −600 | −30 | −590 | −40 |
| 16 | 2-2 | −600 | 4.6 | −610 | −35 | −600 | −50 |
| 17 | 2-3 | −620 | 5.0 | −620 | −50 | −610 | −60 |
| 18 | 2-4 | −590 | 5.2 | −610 | −50 | −605 | −60 |
| 19 | 2-5 | −610 | 4.8 | −595 | −40 | −590 | −55 |
| 20 | 2-6 | −610 | 4.2 | −590 | −25 | −570 | −50 |
| 21 | 2-7 | −600 | 5.1 | −580 | −45 | −570 | −50 |
| 22 | 2-8 | −580 | 4.9 | −600 | −45 | −585 | −60 |
| 23 | 2-9 | −595 | 4.5 | −605 | −40 | −585 | −60 |
| 24 | 2-10 | −605 | 4.7 | −600 | −40 | −600 | −45 |
| 25 | 2-11 | −620 | 5.3 | −600 | −45 | −600 | −50 |
| 26 | 2-12 | −590 | 3.9 | −605 | −25 | −600 | −30 |
| 27 | 2-13 | −610 | 4.5 | −600 | −35 | −590 | −40 |
| 28 | 2-14 | −595 | 5.5 | −590 | −55 | −590 | −60 |
| 29 | 2-15 | −610 | 4.7 | −605 | −45 | −600 | −60 |
| 30 | 2-16 | −600 | 4.0 | −620 | −30 | −600 | −50 |
| 31 | 2-17 | −610 | 4.3 | −595 | −35 | −600 | −35 |
| 32 | 2-18 | −600 | 4.5 | −610 | −35 | −600 | −50 |
| 33 | 3-1 | −620 | 5.2 | −610 | −45 | −600 | −50 |
| 34 | 3-2 | −580 | 4.7 | −620 | −30 | −615 | −30 |
| 35 | 3-3 | −620 | 5.0 | −600 | −30 | −605 | −40 |
| 36 | 3-4 | −600 | 5.6 | −580 | −50 | −590 | −55 |
| 37 | 3-5 | −610 | 5.2 | −585 | −40 | −590 | −40 |
| 38 | 3-6 | −630 | 4.5 | −610 | −35 | −600 | −45 |
| 39 | 3-7 | −590 | 4.1 | −600 | −25 | −600 | −30 |
| 40 | 3-8 | −605 | 4.2 | −590 | −20 | −580 | −30 |
| 41 | 3-9 | −625 | 5.6 | −600 | −45 | −605 | −45 |
| 42 | 3-10 | −605 | 3.9 | −610 | −25 | −615 | −30 |
| 43 | 3-11 | −625 | 3.8 | −615 | −25 | −620 | −30 |
| 44 | 3-12 | −590 | 4.3 | −600 | −35 | −585 | −45 |
| 45 | 3-13 | −610 | 4.5 | −590 | −40 | −590 | −45 |
| 46 | 3-14 | −605 | 5.0 | −600 | −45 | −605 | −50 |

EXAMPLE 47

A coating liquid prepared by dissolving 5 g of 2,4,7-trinitro-9-fluorenone and 5 g of a poly(4,4'-dioxydiphenyl-2,2-propane carbonate) (mol. wt. 300,000) in 70 ml of tetrahydrofuran was applied on the same charge generation layer as formed in Example 1, so as to give a dry coating weight of 10 g/m², and was dried to form a charge transport layer.

The thus prepared electrophotographic photosensitive member was tested for charge bearing characteristics and durability characteristics in the same manner as in Example 1 but with positive charging polarity. The results were as follows:

Vo: +610 V

E ½: 6.0 lux·sec $V_D$ of dark portion at initial charging: +600 V $V_L$ of light portion at initial charging: +55 V $V_D$ at 5000th charging: +590 V $V_L$ at 5000th charging: +60 V

EXAMPLE 48

A 1.1-μm thick subbing layer of poly(vinyl alcohol) was formed on an aluminum layer which had been vapor-deposited on a poly(ethylene terephthalate) film.

The disazo pigment dispersion prepared in Example 1 was applied on the poly(vinyl alcohol) layer by means of a Meyer bar so as to give a dry thickness of 0.5 μm, and was dried to form a charge generation layer.

Then a solution prepared by dissolving 5 g of a pyrazoline derivative of the formula

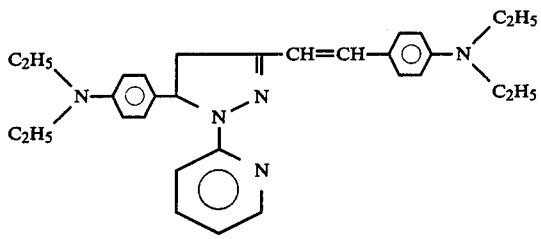

and 5 g of a polyarylate resin (polycondensate of bisphenol A with a terephthalic acid-isophthalic acid mixture) in 70 ml of tetrahydrofuran was applied on the charge generation layer so as to give a dry thickness of 10 μm, and was dried to form a charge transport layer.

The thus prepared photosensitive member was tested for charge bearing characteristics and durability characteristics in the same manner as in Example 1. The results were as follows:
Vo: −580 V
E½: 4.5 lux·sec
$V_D$ at initial charging: −610 V
$V_L$ at initial charging: −25 V
$V_D$ at 5000th charging: −600 V
$V_L$ at 5000th charging: −35 V

EXAMPLE 49

A solution of casein in aqueous ammonia was applied on a 100-μm thick aluminum plate, and dried to form a subbing layer 1.1 μm thick.

A charge-transfer complex was formed by dissolving 5 g of 2,4,7-trinitro-9-fluorenone and 5 g of a poly(N-vinylcarbazole) (number average mol. wt. 300,000) in 70 ml of tetrahydrofuran. This charge-transfer complex and 1 g of the above diazo pigment No. 1-1 were dispersed in a solution of 5 g of a polyester resin (Vylon, made by Toyobo Co., Ltd., Japan) in 70 ml of tetrahydrofuran. The resulting dispersion was applied on the subbing layer so as to give a dry thickness of 12 μm, and was dried to form a photosensitive layer.

The thus prepared photosensitive member was tested for charge bearing characteristics and durability characteristics in the same manner as in Example 1 but with positive charging polarity. The results were as follows:
Vo: +610 V
E½: 5.4 lux.sec
$V_D$ at initial charging: +595 V
$V_L$ at initial charging: +50 V
$V_D$ at 5000th charging: +580 V
$V_L$ at 5000th charging: +50 V

EXAMPLE 50

A coating liquid prepared by dissolving 5 g of 2,4,7-trinitro-9-fluorenone and 5 g of a poly(4,4'-dioxydiphenyl-2,2-propane carbonate) (mol. wt. 300,000) in 70 ml of tetrahydrofuran was applied on the same charge generation layer as formed in Example 15, so as to give a dry coating weight of 10 g/m², and was dried to form a charge transport layer.

The thus prepared photosensitive member was tested for charge bearing characteristics and durability characteristics in the same manner as in Example 1 but with positive charging polarity. The results were as follows:
Vo: +590 V
E½: 5.5 lux.sec
$V_D$ at initial charging: +600 V
$V_L$ at initial charging: +55 V
$V_D$ at 5000th charging: +595 V
$V_L$ at 5000th charging: +60 V

EXAMPLE 51

A 1.1-μm thick subbing layer of poly(vinyl alcohol) was formed on an aluminum layer which had been vapor-deposited on a poly(ethylene terephthalate) film.

The disazo pigment dispersion prepared in Example 15 was applied on the poly(vinyl alcohol) layer by means of a Meyer bar so as to give a dry thickness of 0.5 μm, and was dried to form a charge generation layer.

Then a solution prepared by dissolving 5 g of a pyrazoline derivative of the formula:

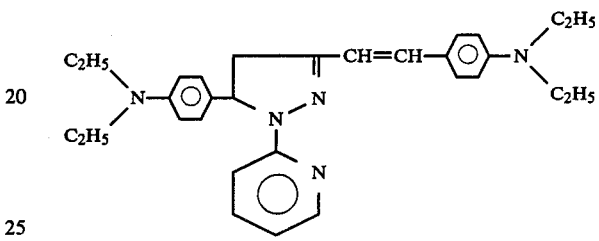

and 5 g of a polyarylate resin (polycondensate of bisphenol A with a terephthalic acid-isophthalic acid mixture) in 70 ml of tetrahydrofuran was applied on the charge generation layer so as to give a dry thickness of 10 μm, and was dried to form a charge transport layer.

The thus prepared photosensitive member was tested for charge bearing characteristics and durability characteristics in the same manner as in Example 1. The results were as follows:
Vo: −610 V
E½: 4.4 lux.sec
$V_D$ at initial charging: −610 V
$V_L$ at initial charging: −30 V
$V_D$ at 5000th charging: −600 V
$V_L$ at 5000th charging: −35 V

EXAMPLE 52

A solution of casein in aqueous ammonia was applied on a 100 μm thick aluminum plate, and dried to form a subbing layer 1.1 μm thick.

A charge-transfer complex was formed by dissolving 5 g of 2,4,7-trinitro-9-fluorenone and 5 g of a poly(N-vinylcarbazole) (number average mol. wt. 300,000) in 70 ml of tetrahydrofuran. This charge-transfer complex and 1 g of the above disazo pigment No. 2-1 were dispersed in a solution of 5 g of a polyester resin (Vylon, made by Toyobo Co., Ltd. Japan) in 70 ml of tetrahydrofuran. The resulting dispersion was applied on the subbing layer so as to give a dry thickness of 12 μm, and was dried to form a photosensitive layer.

The thus prepared photosensitive member was tested for charge bearing characteristics and durability characteristics in the same manner as in Example 1 but with positive charging polarity. The results were as follows:
Vo: +620 V
E½: 5.6 lux.sec
$V_D$ at initial charging: +590 V
$V_L$ at initial charging: +55 V
$V_D$ at 5000th charging: +580 V
$V_L$ at 5000th charging: +65 V

EXAMPLE 53

A coating liquid prepared by dissolving 5 g of 2,4,7-trinitro-9-fluorenone and 5 g of a poly(4,4'-dioxydiphenyl-2,2-propane carbonate) (mol. wt. 300,000) in 70 ml of tetrahydrofuran was applied on the same charge generation layer as formed in Example 33, so as to give a dry coating weight of 10 g/m², and was dried to form a charge transport layer.

The thus prepared photosensitive member was tested for charge bearing characteristics and durability characteristics in the same manner as in Example 1 but with positive charging polarity. The results were as follows:

$V_O$: +630 V
$E_{\frac{1}{2}}$: 5.8 lux.sec
$V_D$ at initial charging: +610 V
$V_L$ at initial charging: +60 V
$V_D$ at 5000th charging: +605 V
$V_L$ at 5000th charging: +65 V

EXAMPLE 54

A 1.1-μm thick subbing layer of poly(vinyl alcohol) was formed on an aluminum layer which had been vapor-deposited on a poly(ethylene terephthalate) film.

The disazo pigment dispersion prepared in Example 33 was applied on the poly(vinyl alcohol) layer by means of a Meyer bar so as to give a dry thickness of 0.5 μm, and was dried to form a charge generation layer.

Then a solution prepared by dissolving 5 g of a pyrazoline derivative of the formula:

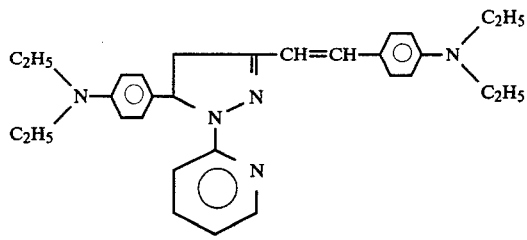

and 5 g of a polyarylate resin (polycondensate of biphenol A with a terephthalic acid-isophthalic acid mixture) in 70 ml of tetrahydrofuran was applied on the charge generation layer so as to give a dry thickness of 10 μm, and was dried to form a charge transport layer.

The thus prepared photosensitive member was tested for charge bearing characteristics and durability characteristics in the same manner as in Example 1. The results were as follows:

$V_O$: −590 V
$E_{\frac{1}{2}}$: 4.4 lux.sec
$V_D$ at initial charging: −610 V
$V_L$ at initial charging: −25 V
$V_D$ at 5000th charging: −605 V
$V_L$ at 5000th charging: −35 V

EXAMPLE 55

A solution of casein in aqueous ammonia was applied on a 100-μm thick aluminum plate, and dried to form a subbing layer 1.1 μm thick.

A charge-transfer complex was formed by dissolving 5 g of 2,4,7-trinitro-9-fluorenone and 5 g of a poly(N-vinylcarbazole) (number average mol. wt. 300,000) in 70 ml of tetrahydrofuran. This charge-transfer complex and 1 g of the above disazo pigment No. 3-1 were dispersed in a solution of 5 g of a polyester resin (Vylon, made by Toyobo Co. Ltd., Japan) in 70 ml of tetrahydrofuran. The resulting dispersion was applied on the subbing layer so as to give a dry thickness of 12 μm, and was dried to form a photosensitive layer.

The thus prepared photosensitive member was tested for charge bearing characteristics and durability characteristics in the same manner as in Example 1 but with positive charging polarity. The results were as follows:

$V_O$: +605 V
$E_{\frac{1}{2}}$: 5.6 lux.sec
$V_D$ at initial charging: +590 V
$V_L$ at initial charging: +50 V
$V_D$ at 5000th charging: +580 V
$V_L$ at 5000th charging: +55 V

What is claimed is:

1. An electrophotographic photosensitive member having a photosensitive layer on or over an electrically conductive substrate, the photosensitive layer comprising an organic photoconductive material selected from the group consisting of the following general formulas (1), (2) and (3):

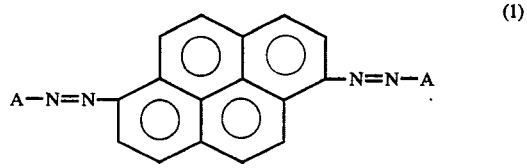

wherein A is a coupler component having aromaticity,

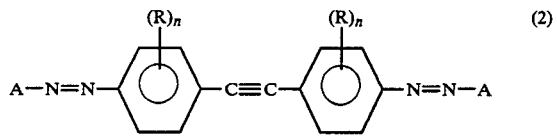

wherein A is a coupler component having aromaticity, R is hydrogen, halogen, alkyl, or alkoxy, and n is an integer of 1 to 4,

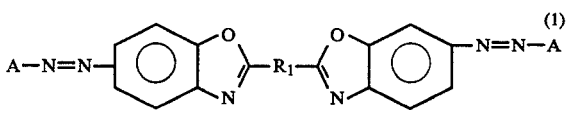

wherein A is a coupler component having aromaticity and $R_1$ is a single bond or a substituted or unsubstituted divalent hydrocarbon or heterocyclic residue.

2. The electrophotographic photosensitive member of claim 1, wherein A in the general formulas (1) to (3) is a coupler component having a phenolic hydroxyl group.

3. The electrophotographic photosensitive member of claim 2, wherein the coupler component having a phenolic hydroxyl group is of a hydroxynaphthoic acid amide type, hydroxynaphthoic acid imide type, or aminonaphthol type.

4. The electrophotographic photosensitive member of claim 3, wherein the coupler of hydroxynaphthoic acid amide type is represented by the following general formula (A):

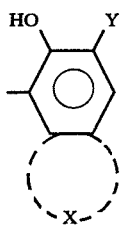

(A)

where, X is a residue which is condensed with the benzene ring to form an aromatic hydrocarbon ring or heterocyclic ring and Y is the group

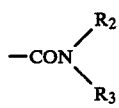

or —COOR$_3$ wherein R$_2$ is hydrogen, substituted or unsubstituted alkyl, substituted or unsubstituted aryl, aralkyl, amino, or heterocyclic radical and R$_3$ is substituted or unsubstituted alkyl or substituted or unsubstituted aryl radical.

5. The electrophotographic photosensitive member of claim 4, wherein X in the general formula (A) is a residue which is condensed with the benzene ring to form a naphthalene ring or anthracene ring.

6. The electrophotographic photosensitive member of claim 4, wherein X in the general formula (A) is a residue which is condensed with the benzene ring to form a dibenzofuran ring, carbazole ring, or benzocarbazole ring.

7. The electrophotographic photosensitive member of claim 3, wherein the coupler of hydroxynaphthoic acid imide type is of the following general formula (B) or (C):

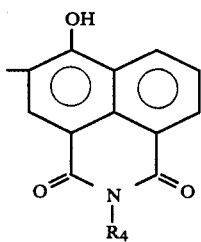

(B)

wherein R$_4$ is a substituted or unsubstituted alkyl, aryl, or aralkyl radical,

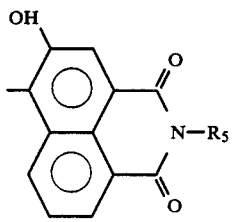

(C)

wherein R$_5$ is a substituted or unsubstituted alkyl, aryl, or aralkyl radical.

8. The electrophotographic photosensitive member of claim 3, wherein the coupler of aminonaphthol type is represented by the following general formula (D):

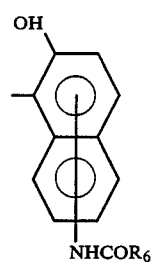

(D)

wherein R$_6$ is a substituted or unsubstituted alkyl, aryl, or aralkyl radical.

9. The electrophotographic photosensitive member of claim 1, wherein R$_1$ in the general formula (3) is the radical —CH=CH—,

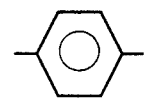

or

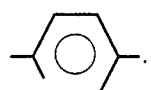

10. The electrophotographic photosensitive member of claim 1, wherein the photosensitive layer has a laminate structure comprising a charge generation layer and a charge transport layer, and the charge generation layer comprises an organic photoconductive material of the general formula (1), (2) or (3).

11. The electrophotographic photosensitive member of claim 10, wherein the charge transport layer is laminated upon the upper side of the charge generation layer.

12. The electrophotographic photosensitive member of claim 11, wherein the charge generation layer is 5 μm or less in thickness.

13. The electrophotographic photosensitive member of claim 11, wherein the charge generation layer is 0.01–1 μm in thickness.

14. The electrophotographic photosensitive member of claim 1, wherein a subbing layer is further provided between the photosensitive layer and the electrically conductive substrate.

15. The electrophotographic photosensitive member of claim 14, wherein the subbing layer comprises a copolymerized polyamide resin.

16. The electrophotographic photosensitive member of claim 1, wherein the photosensitive layer comprises an organic photoconductive material represented by the general formula (1), (2) or (3) and a charge-transporting material.

17. An organic photoconductive material selected from the group consisting of the following general formulas (1), (2) and (3):

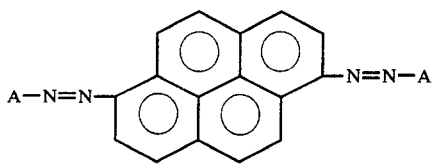 (1)

wherein A is a coupler having aromaticity,

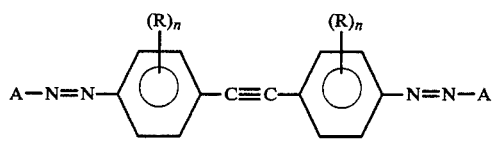 (2)

wherein A is a coupler having aromaticity, R is hydrozen, halogen, alkyl, or alkoxy, and n is an integer of 1 to 4,

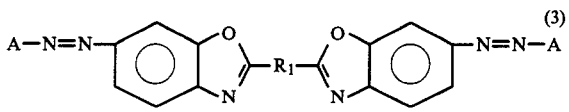 (3)

wherein A is a coupler having aromaticity and $R_1$ is a single bond or a substituted or unsubstituted divalent hydrocarbon or heterocyclic residue.

18. The organic photoconductive material of claim 17, where A in the general formulas (1) to (3) is a coupler component having a phenolic hydroxyl group.

19. The organic photoconductive material of claim 18, wherein the coupler component having a phenolic hydroxyl group is of a hydroxynaphthoic acid amide type, hydroxynaphthoic acid imide type, or aminonaphthole type.

20. The organic photoconductive material of claim 19, wherein the coupler of hydroxynaphthoic acid amide type is represented by the following general formula (A):

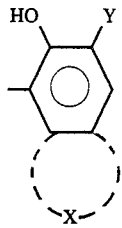 (A)

wherein X is a residue which is condensed with the benzene ring to form an aromatic hydrocarbon or heterocyclic ring, and Y is the group

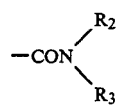

or —$COOR_3$ wherein $R_2$ is hydrogen or a substituted or unsubstituted alkyl, aryl, aralkyl, amino, or heterocyclic radical and $R_3$ is a substituted or unsubstituted alkyl or aryl radical.

21. The organic photoconductive material of claim 20, wherein X in the general formula (A) is a residue which is condensed with the benzene ring to form a naphthalene ring or anthracene ring.

22. The organic photoconductive material of claim 20, wherein X in the general formula (A) is a residue which is condensed with the benzene ring to form a dibenzofuran ring, carbazole ring, or benzocarbazole ring.

23. The organic photoconductive material of claim 19, wherein the coupler of hydroxynaphthoic acid imide type is represented by the following general formula (B) or (C):

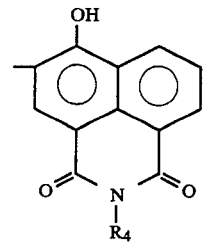 (B)

wherein $R_4$ is a substituted or unsubstituted alkyl, aryl, or aralkyl radical,

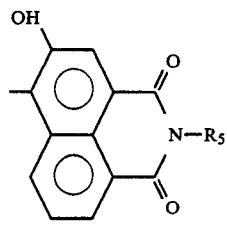 (C)

wherein $R_5$ is a substituted or unsubstituted alkyl, aryl, or aralkyl radical.

24. The organic photoconductive material of claim 19, wherein the coupler of aminonaphthol type is represented by the following general formula (D):

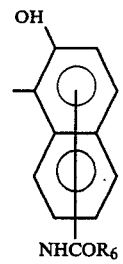 (D)

wherein $R_6$ is a substituted or unsubstituted alkyl, aryl, or aralkyl radical.

25. The organic photoconductive material of claim 17, where $R_1$ in the general formula (3) is the radical

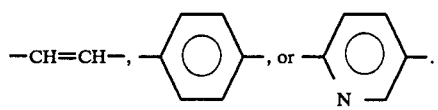

26. A method for forming images which comprises the steps of
(a) applying charge to an electrophotographic photosensitive member comprising an electrically conductive substrate, a charge generation layer and a charge transport layer, the charge generation layer comprising an organic photoconductive material selected from the group consisting of the following general formulas (1), (2) and (3):

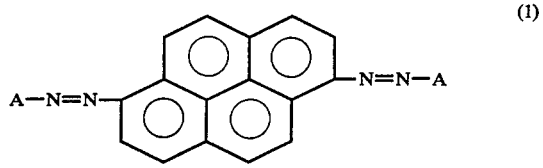

wherein A is a coupler component having aromaticity,

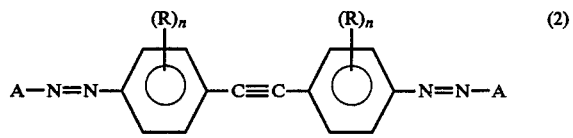

wherein A is a coupler component having aromaticity, R is hydrogen, halogen, alkyl, or alkoxy, and n is an integer of 1 to 4,

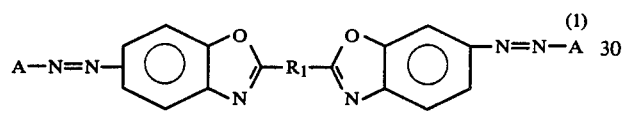

wherein A is a coupler component having aromaticity and $R_1$ is a single bond or a substituted or unsubstituted divalent hydrocarbon or heterocyclic residue;
(b) image-exposing to form a static latent image;
(c) developing the static latent image to form a toner image;
(d) transferring the developed toner image to a transfer member;
(e) exposing light to the electrophotographic photosensitive member so as to eliminate the residual charge; and
(f) removing the remained toner from the electrophotographic photosensitive member by a cleaner.

27. The method for forming images of claim 26, wherein steps (a), (b), (c), (d), (e) and (f) are carried out in this order.

28. The method for forming images of claim 26, wherein the step further comprises fixing toner images transferred from the step (d).

29. The method for forming images of claim 26, wherein a potential at the light portion at the 5000th of the repeated process shows twice or lower as that of initial process.

30. The method for forming images of claim 26, wherein the charge transporting layer is substantially insensible for wavelength region of the light used in the image-exposing step (b).

31. The method for forming images of claim 26, wherein the charge transporting layer is substantially insensible for wavelength region of the light used in step (e).

32. The method for forming images of claim 26, wherein the charge transporting layer comprises hydrazones and binder.

33. The method for forming images of claim 32, wherein the hydrazones is p-dialkyl-aminobenzaldehyde-N,N-diarylhydrazones.

34. The method for forming images of claim 32, wherein the hydrazone is p-diarylaminobenzaldehyde-N,N-diarylhydrazones.

35. The method for forming images of claim 26, wherein the applied charge in step (a) is positive, and the toner used in step (c) has negative charge.

36. The method for forming images of claim 26, wherein a subbing layer is further provided between the electrically conductive substrate and charge generating layer, the subbing layer comprising polyamide.

37. The method for forming images of claim 36, wherein polyamide is copolymerized polyamide.

38. An electrophotographic photosensitive member comprising an electrically conductive substrate, a charge generation layer and a charge transport layer in which binder comprises hydrazones, the charge generation layer comprising disazo pigment selected from the group consisting of the following general formulas (1), (2) and (3):

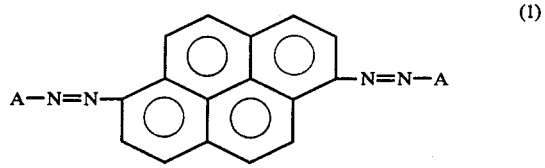

wherein A is a coupler component having aromaticity,

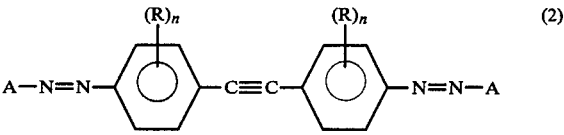

wherein A is a coupler component having aromaticity, R is hydrogen, halogen, alkyl, or alkoxy, and n is an integer of 1 to 4,

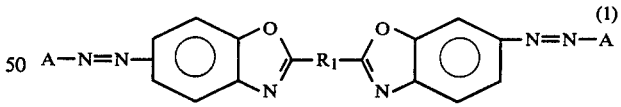

wherein A is a coupler component having aromaticity and $R_1$ is a single bond or a substituted or unsubstituted divalent hydrocarbon or heterocyclic residue.

39. The electrophotographic photosensitive member of claim 38, wherein the hydrazone is p-dialkylaminobenzaldehyde-N,N-diarylhydrazone.

40. The electrophotographic photosensitive member of claim 38, wherein the hydrazone is p-diarylaminobenzaldehyde-N,N-diarylhydrazone.

41. The electrophotographic photosensitive member of claim 38, wherein the hydrazone is selected from the group consisting of p-diphenylaminobenzaldehyde-N,N-diphenylhydrazone, p-diphenylaminobenzaldehyde-N-phenyl-N-methylhydrazone, and p-ditolylaminobenzaldehyde-N,N-diphenylhydrazone.

* * * * *

UNITED STATES PATENT AND TRADEMARK OFFICE
CERTIFICATE OF CORRECTION

PATENT NO. : 4,495,264  Page 1 of 5

DATED : January 22, 1985

INVENTOR(S) : HIDEYUKI TAKAHASHI, ET AL.

It is certified that error appears in the above-identified patent and that said Letters Patent is hereby corrected as shown below:

Cols. 13,14, Fig. "2-3"

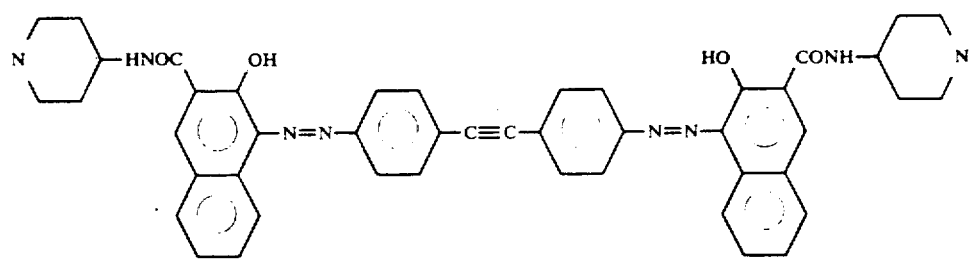

should be --2-3--

2-3

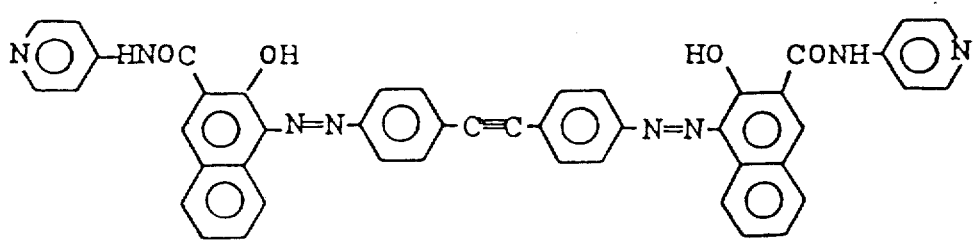

UNITED STATES PATENT AND TRADEMARK OFFICE
CERTIFICATE OF CORRECTION

PATENT NO. : 4,495,264

DATED : January 22, 1985

INVENTOR(S) : HIDEYUKI TAKAHASHI, ET AL.

It is certified that error appears in the above-identified patent and that said Letters Patent is hereby corrected as shown below:

Cols. 23, 24 Fig. "3-12"

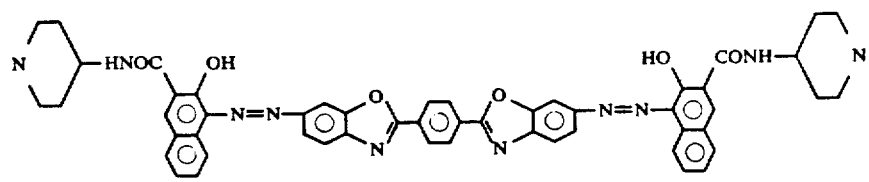

should be --3-12--

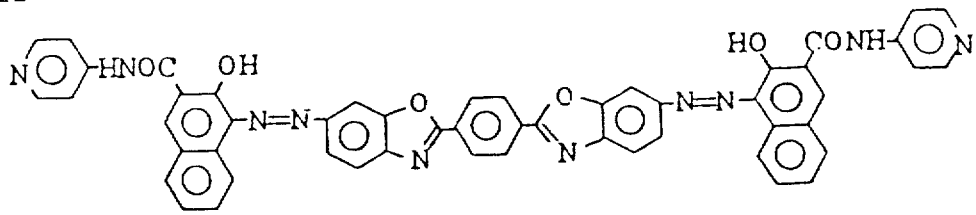

UNITED STATES PATENT AND TRADEMARK OFFICE
CERTIFICATE OF CORRECTION

PATENT NO. : 4,495,264

DATED : January 22, 1985

INVENTOR(S) : HIDEYUKI TAKAHASHI, ET AL.

It is certified that error appears in the above-identified patent and that said Letters Patent is hereby corrected as shown below:

Cols. 25, 26 Fig. "3-16"

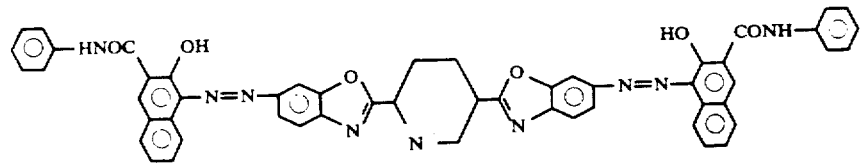

should be --3-16--

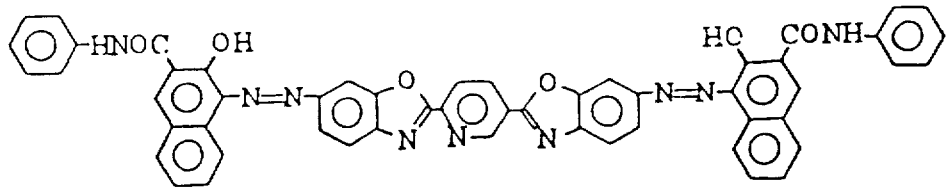

Cols. 25, 26 Fig. "3-17"

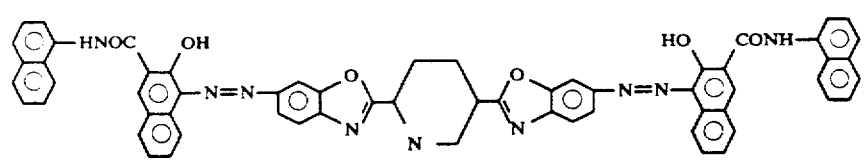

should be --3-17--

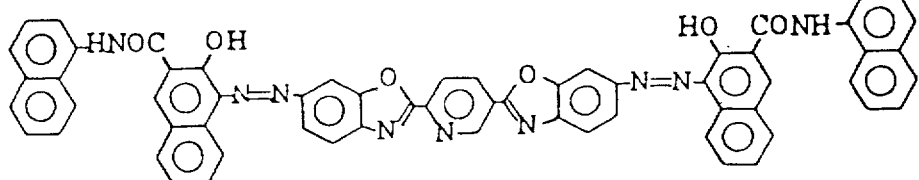

UNITED STATES PATENT AND TRADEMARK OFFICE
CERTIFICATE OF CORRECTION

PATENT NO. : 4,495,264
DATED : January 22, 1985
INVENTOR(S) : HIDEYUKI TAKAHASHI, ET AL.

It is certified that error appears in the above-identified patent and that said Letters Patent is hereby corrected as shown below:

Col. 25, 26 Fig. "3-18"

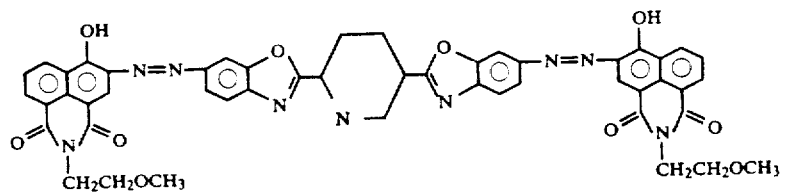

should be --3-18--

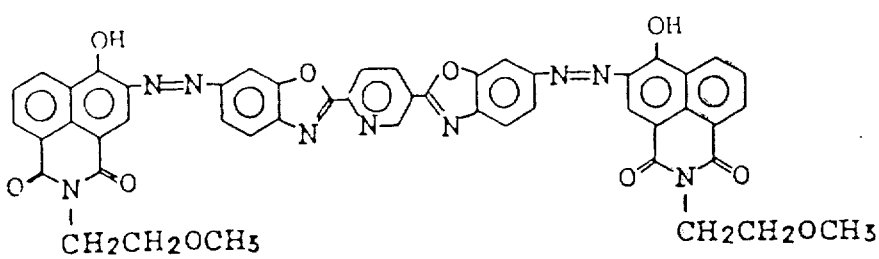

Col. 29, line 46, after "derived" insert --from--

Col. 30, line 51, change "polyvinylanthracenes" to --polyvinylanthracene--

Col. 31, line 37, after "transferred" insert --from its--

Col. 37, line 42, "biphenol A" should be --bisphenol A--

Col. 38, line 46, change "(1)" to --(3)--

Col. 43, line 29, change "(1)" to --(3)--

UNITED STATES PATENT AND TRADEMARK OFFICE
CERTIFICATE OF CORRECTION

PATENT NO. : 4,495,264

DATED : January 22, 1985

INVENTOR(S) : HIDEYUKI TAKAHASHI, ET AL.

It is certified that error appears in the above-identified patent and that said Letters Patent is hereby corrected as shown below:

Col. 44, line 48, change "(1)" to --(3)--

Signed and Sealed this

Twenty-first Day of January 1986

[SEAL]

Attest:

DONALD J. QUIGG

Attesting Officer    Commissioner of Patents and Trademarks